United States Patent [19]
Funakoshi et al.

[11] Patent Number: 5,387,798
[45] Date of Patent: Feb. 7, 1995

[54] UV-A, UV-B DISCRIMINATION SENSOR

[75] Inventors: Nobuhiro Funakoshi; Fumihiro Ebisawa, both of Naka; Mitsutoshi Hoshino, Mito; Takashi Yoshida, Iruma; Ken Sukegawa; Akira Morinaka, both of Mito; Norio Sashida, Fujisawa; Shigeko Toeda, Chiba; Miwa Urabe, Tokyo, all of Japan

[73] Assignee: Nippon Telegraph and Telephone Corporation, Tokyo, Japan

[21] Appl. No.: 194,627

[22] Filed: Feb. 9, 1994

Related U.S. Application Data

[63] Continuation of Ser. No. 972,546, Nov. 6, 1992, abandoned.

[30] Foreign Application Priority Data

| Mar. 23, 1992 | [JP] | Japan | 4-094974 |
| Jun. 22, 1992 | [JP] | Japan | 4-185668 |

[51] Int. Cl.⁶ .................................................. G01J 5/48
[52] U.S. Cl. .................................................... 250/474.1
[58] Field of Search ......................... 250/474.1, 372 EM

[56] References Cited

U.S. PATENT DOCUMENTS

| 4,130,760 | 12/1978 | Fanselow et al. | 250/474.1 |
| 4,829,187 | 5/1989 | Tomita et al. | 250/474.1 |
| 5,028,792 | 7/1991 | Mullis | 250/474.1 |
| 5,296,275 | 3/1994 | Goman et al. | 428/29 |

FOREIGN PATENT DOCUMENTS

| 0046158 | 2/1982 | European Pat. Off. |
| 0290750 | 11/1988 | European Pat. Off. |
| 0325863 | 8/1989 | European Pat. Off. |
| 685465 | 12/1939 | Germany |
| 8903470 | 7/1989 | Germany |
| 9100010 | 3/1991 | Germany |
| 1-262425 | 10/1989 | Japan ............ 250/372 EM |
| 2236466 | 4/1991 | United Kingdom |

OTHER PUBLICATIONS

"Reusable ultraviolet monitors: Design, characteristics, and efficacy", Dan L. Fanselow et al., Journal of the American Academy of Dermatology, 9(5):714–723 (1983).

*Primary Examiner*—Constantine Hannaher
*Attorney, Agent, or Firm*—Finnegan, Henderson, Farabow, Garrett & Dunner

[57] ABSTRACT

A UV-A, UV-B discriminating sensor provided with a photochromic compound or photochromic composition as the sensor portion, the photochromic compound or photochromic composition coloring under exposure to UV of wavelength greater than or equal to 280 nm or less than or equal to 400 nm, and wherein at least a portion of the photochromic layer is covered with a layer containing a pigment which absorbs UV of wavelength less than 320 nm, or with a layer containing a pigment which absorbs UV of a wave length greater than or equal to 320 nm but less than or equal to or equal to 400 nm.

3 Claims, 19 Drawing Sheets

UV-A, UV-B DISCRIMINATION SENSOR

This application is a continuation of application Ser. No. 07/972,546, filed Nov. 6, 1992, now abandoned.

BACKGROUND OF THE INVENTION

The present invention relates to a UV-A, UV-B discrimination sensor for measuring the presence or absence and intensity of UV rays, as well as for distinguishing between long and medium wave length UV rays.

Light waves from the sun which reach the earth are divided into infrared rays, visible light rays and UV rays on the basis of the region of-the wavelength. In terms of total energy released from the sun, infrared rays comprise 42%, visible light rays comprise 52% and UV rays comprise 6%. However, in terms of the energy of the light, as compared to infrared and visible light rays, UV rays have the larger effect on living organisms.

In terms of biological effects, UV rays may be categorized into three different types: long wavelength UV rays (UV-A: 320~400nm), medium wavelength UV rays (UV-B: 280~320 nm) and short wavelength UV rays (UV-C: 190~280 nm). Of these, UV C rays are absorbed by the ozone layer which surrounds the earth and do not reach the earth's surface. UV-A and UV-B rays reach the earth's surface and are well known to bring about a number of effects. (see "Chemistry and Chemical Industry," vol. 40, no. 6, page 467 (1987)).

UV rays cause suntanning in humans. However, depending on the type of UV ray, suntanning is caused in different ways and may be divided into the following two categories.

Long wavelength UV-A causes skin darkening only, thereby producing a suntanned appearance. The long wavelength UV-A rays also directly participate in the formation of vitamin D and generally have positive effects on human beings. In contrast however, the short wavelength UV-B rays cause blotting and freckling of the skin, and cause blistering and sunburn (sunburn damage extends several layers deep); UV-B therefore has deleterious effects on human beings. It is particularly easy to be effected by UV-B while performing open air activities at, for example, the beach or mountains. Even if activities such as going to the beach, where UV rays are especially strong, are avoided, suntanning nevertheless occurs on a daily basis.

The quantity of UV increases greatly during the period from spring to summer, and is during this time two to three times greater than when the quantity of UV is at its minimum (in December). Additionally, on a daily basis, the quantity of UV peaks during the hours of 11 in the morning to 2 in the afternoon. Moreover, because UV rays reach the earth's surface even on overcast days, and because the quantity of UV-A does not change significantly between cloudy days and clear days, it is difficult to estimate directly the quantity of UV from the brightness of the light.

Accordingly, there are two types of sun protection formulations, or so-called anti-sunburn cosmetic preparations, utilized as protective measures against sunburning, one type being for prevention of both suntan and sunburn, and the other type being for obtaining an attractive suntan while preventing sunburn. Used as the latter are formulations referred to as "UV-B sun protection formulations" which absorb only UV-B, allowing penetration of UV-A. Used as the former are sun protection types which absorb both UV-A and UV-B, however more numerous are sun protection types referred to as "UV-A sun protection formulations" which primarily absorb UV-A, and types which prevent both suntanning and sunburning by combination with a UV-B sun protection formulation.

If the light quantity of UV-A and UV-B rays can be measured, then the above types of sun protection formulations can be appropriately utilized, making it possible to take effective countermeasures against sunburn.

Moreover, due to detection of the ozone hole in recent years, it has been pointed out that there is a damage of an increase in the number of cases of skin cancer. If the ozone hole grows larger, or, even if the ozone hole does not grow larger but the thickness of the ozone layer decreases, there will, in proportion to this, be an increase in the light quantity of UV-B. In terms of harmful effects on human beings, ~305 nm UV ray, which falls in the UV-B region, destroys the genetic material, DNA, with the result being that there is an increased risk of developing skin cancer. The light quantity of UV-A and UV-B are not proportional and it is not possible to directly predict UV-A light quantity and UV-B light quantity from the combined total of UV light quantity. Further, neither is the amount of cloud cover in the sky and the total UV quantity proportional; accordingly, it is dangerous to neglect taking appropriate countermeasures in regard to UV exposure merely for the reason that the sky is clouded over.

UV sensors have recently been marketed as a means to conveniently measure the presence or absence and intensity of UV. In such types of UV sensors, a composition such as a photochromic compound which displays a change upon exposure to UV is soaked into a binder of, for example, paper. When the UV sensor is held aloft, the presence or absence and the intensity of the UV may be measured by the amount of change in color or color density.

Further, as a suntanning sensor, a sensor which eliminates the effects from visible and infrared light and measures UV-A and UV-B has been developed (see: sales catalogue for Toray Techno. Co., Ltd.). This type Of Uv Sensor is very expensive.

As was stated above, there are two types of UV, UV-A and UV-B, which reach the earth's surface from the sun, however, conventional UV sensors were not able to distinguish between UV-A and UV-B. It is therefore not possible to discern whether the presence or intensity of the UV measured was due to UV-A, UV-B or to a combination of both.

Accordingly, without being able to judge whether only suntanning would occur, or whether suntanning accompanied by sunburning would occur, it was difficult to decide upon effective countermeasures to avoid UV exposure.

As it was not possible for the simple conventional UV sensors to distinguish between UV-A and UV-B, it was necessary to combine a diffraction grating or interference filter with a light quantity meter.

There have been developed, for example, multi-band UV light quantity meters and illuminance meters which, rather than being utilized to measure the UV in sunlight, have instead applications related to the industrial use of UV such as, for example, application primarily as a monitor to monitor UV quantity for an UV curable resin. Such multi-band UV light quantity meters and illuminance meters can distinguish between UV-A waves for which the wave length is 320 nm to 400 nm, and UV-B waves, for which the wave length is 270 nm to 310 nm. (see sales catalogue of Orc Manufacturing Co., Ltd.). Moreover, also available as compact and handy devices are thin-type UV light quantity meters. These are sensors which measure only a portion of UV-A, from wave lengths of 320 nm to 390 nm.

Such UV-A, UV-B discriminating sensors have a structure wherein a junctional semiconductor device is used as the sensor portion and a band pass filter is attached to the light intake portion.

UV sensors and UV-A, UV-B discriminating sensors are both light sensors which utilize semiconductor devices and are designed to exhibit sensitivity to UV. The discrimination or selection of UV is carried out by a band pass filter for use in optics which is attached to the sensor window. Accordingly, it is necessary to include an electronic circuit which is capable of displaying the output photocurrent on a meter or display. For this reason, conventional UV sensors all require a certain thickness (greater than several millimeters) and size (greater than several centimeters). Moreover, also necessary to operate these is an electric source.

Conventional sensors therefore required large-scale devices, electricity to drive these devices and special expertise. Moreover, from an economical point of view, such devices are very expensive. For these reasons, therefore, the development of a convenient UV-A, UV-B discriminating sensor capable of distinguishing between UV-A and UV-B was strongly desired.

The object of the present invention is to provide a convenient UV-A, UV-B discriminating sensor which can easily discriminate between the presence or absence and quantity of UV-A and UV-B, and for which no special expertise or special devices are required.

SUMMARY OF THE INVENTION

In summarizing the present invention, a first aspect of the present invention relates to a UV-A, UV-B discriminating sensor and which is characterized in the provision of a photochromic layer as the sensor portion, this photochromic layer containing a photochromic compound or photochromic composition which colors under exposure to UV of wavelength greater than or equal to 280 nm but less than or equal to 400 nm, and in the inclusion in at least a portion of the photochromic layer of a pigment which absorbs UV rays of wavelength less than 320 nm.

A second aspect of the present invention is a UV sensor provided, as the sensor portion, with a photochromic layer containing a photochromic compound or photochromic composition which colors under exposure to UV of wavelength greater than or equal to 280 nm but less than or equal to 400 nm, and which is characterized in the inclusion in at least a portion of the photochromic layer of a pigment which absorbs UV of wavelength greater than or equal to 320 nm but less than or equal to 400 nm.

A third aspect of the present invention is a UV sensor provided, as the sensor portion, with a photochromic layer containing a photochromic compound or photochromic composition which colors under exposure to UV of wavelength greater than or equal to 280 nm and less than or equal to 400 nm, and which is characterized in that at least a portion of the photochromic layer is covered with a layer containing a pigment which absorbs UV of wavelength less than 320 nm.

A fourth aspect of the present invention is a UV sensor provided, as the sensor portion, with a photochromic layer containing a photochromic compound or photochromic composition which colors under exposure to UV of wavelength greater than or equal to 280 nm but less than or equal to 400 nm, and which is characterized in that at least a portion of the photochromic layer is covered with a layer containing a pigment which absorbs UV of wavelength of greater than or equal to 320 nm but less than or equal to 400 nm.

A fifth aspect of the present invention is a photochromic composition for use in UV-A, UV-B discrimination, characterized in the inclusion in the photochromic composition which colors under exposure to UV of wavelength greater than or equal to 280 nm but less than or equal to 400 nm of a pigment which absorbs UV of a wavelength of less than 320 nm.

A sixth aspect of the present invention is a photochromic composition for use in UV-A, UV-B discrimination, characterized in the inclusion in the photochromic composition which colors under exposure to UV of wavelength greater than or equal to 280 nm but less than or equal to 400 nm of a pigment which absorbs UV of wavelength greater than or equal to 320 nm but less than or equal to 400 nm.

A seventh aspect of the present invention is a UV-A, UV-B discriminating sensor capable of discriminating between UV-A and UV-B and provided with a sensor portion for detecting UV-A and a sensor portion for detecting UV-B by means of the combination and parallel disposition of, respectively, the UV-A, UV-B discriminating sensors of the first and third aspects of the present invention, and the UV-A, UV-B discriminating sensors of the second and fourth aspects of the present invention.

In the present invention a layer of a photochromic compound sensitive to both A and B wavelengths is disposed on or mixed in a paper, plastic or glass substrate. Moreover, on top of or in the photochromic compound layer there are arranged in parallel, a UV sensor portion which changes in response to UV-A only, wherein there is disposed a pigment absorbing UV-B but not UV-A; a UV sensor portion which changes in response to UV-B only, wherein there is disposed a pigment absorbing UB-A but not UV-B; and, as necessity dictates, a UV sensor sensitive to both UV-A and UV-B wherein no pigment is disposed. By means of the comparison of the color changes demonstrated by the UV-A, UV-B discriminating sensor of the present invention, a main characterizing feature of the present invention, namely easily rendering a judgement on the presence or absence and quantity of both UV-A and UV-B, is realized.

The present invention differs from conventional UV sensors in that it is capable of discriminating between UV-A and UV-B. Further, in conventional sensors, in order to distinguish between UV-A and UV-B, it was necessary to combine a diffraction grating or interference filter with the light quantum meter. However, if the present invention is utilized, the convenient sensor device does not require driving energy.

In order that it be possible to construct the UV-A, UV-B discriminating sensor of the present invention utilizing the print method, a thickness of several tens of micrometers or less and a surface area size only large enough to be visible to the naked eye is permissible; a square size of several millimeters is also possible. Further, because a photochromic reaction is utilized, an electric source is not necessary. Moreover, a main characteristic of the sensor portion is, due to the use of the print method, the ability to ignore effects from materials or the surface condition of the materials, and, moreover, the fact that construction may be suited to not only flat surfaces, but also to solid curving surface or irregular surfaces. Still further, as stated above, in the present invention, an integrated formation method may be employed in place of the print method.

Applicable for use in the present invention are conventionally known photochromic compounds which color under exposure to UV of wavelength greater than or equal to 280 nm but less than or equal to 400 nm.

For example, the following detailed publications are available: 1) G. H. Brown (Ed.), "Photochromism," 1971, John Willy & Sons, Inc. (New York), 2) H. Durr and H. Bouas-Laurent (Ed), "Photochromism, Molecules and Systems," 1990, Elsevier (Amsterdam).

As representative examples of the photochromic compound used in the present invention, available are: members of the spiropyran class having the following structure:

spiro(2H-1-benzopyran-2,2'-indoline), spiroindolinenaphthopyran, spiro (2H-1-benzopyran-2,2'-benzothiazoline), spiro (2H-1-benzopyran-2,2'-benzooxazoline), spirobenzothiazoline-2,3'- (3H) -naphtho (2,1-b)pyran), spiro (2H-1-benzopyran-2,2'-naphtho (2,3-d) oxazolin, spiro (2H-1-benzopyran-2,2'-naphtho (2,1-d) oxazoline), spiro(indoline-2,2'-pyrano (3,2H)quinoline), spiro(indoline-2,3'-(3H)-naphtho (2,1-b)-1,4-oxazine), spiro(indoline-2,2'-(2H)-pyrano(3,4-b) pyridine), spiro(indoline-2,2'- (2H) -pyrano (3,2-b) pyridine, spiro (indoline-2,2'-(2H)- pyrano(3,2-c)quinoline) (spiro(2H-1,4-benzooxazoline-2,2 -indoline), spiro (2H-1-benzopyran-2,2'-(2H)quinoline), spiro(3H-naphtho(2,1-b)pyran-3,2'-(2H)pyridine), spiro (indoline-2,2'-(2H)pyrano(2,3-b)indol), spiro(2H-1-benzothiano (2,3-b)pyran-2,2'-indoline);

members of the fulgide class having a structure indicated by the following general formula:

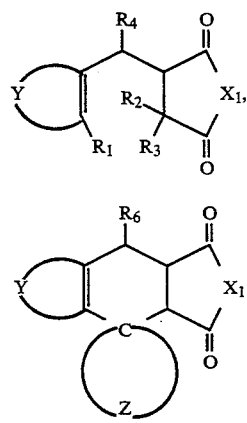

($X_1$ in general formula 1 or 0 or an N-$R_5$ group ($R_5$ indicates H, or alkyl or allyl groups which may respectively have substitutional groups), Y indicates 2-value aromatic hydrocarbon groups or 2-value unsaturated heterocyclic groups which may respectively have substitutional groups. The group shown by the following chemical formula 2,

indicates a norbornylidene group or a adamantylidene group, which may respectively have substitutional groups; $R_1$, $R_2$, $R_3$, $R_4$, and $R_6$ may respectively indicate any one of: hydrogen, alkyl group, allyl group, aralkyl group, alkoxy group, allyloxy group, amino group, pyrrolyl group, thyenyl group, furyl group, or halogen);

members of the diallyl ethene class having a structure indicated by the following general formula 3:

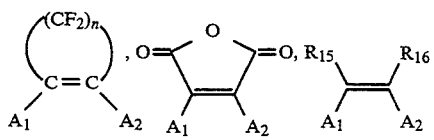

(In general formula 3, $A_1$ and $A_2$ may be identical or differing groups and are represented by the following general formula 4:

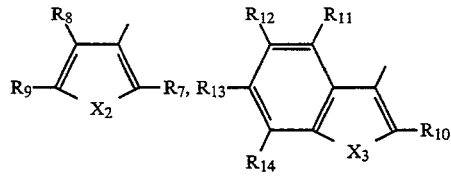

$X_2$ and $X_3$ in general formula 4 indicate sulfur or N-$R_{17}$ ($R_{17}$ indicates hydrogen, or alkyl or allyl groups which may respectively have substitutional groups). $X_2$ and $X_3$ may be identical or differing atoms or groups. Further, $R_7$ and $R_{10}$ indicate alkyl group, cyano group or alkoxy group, however, a methyl group is preferable. $R_8$, $R_9$, $R_{11}$, $R_{12}$, $R_{13}$, $R_{14}$, $R_{15}$, and $R_{16}$ in formulas 3 and 4 indicate hydrogen, alkyl group, cyano group or halogen; n is an integer from 2 to 5.).

Furthermore, usable as the inorganic photochromic material are alkali metals such as potassium chloride, sodium chloride and potassium bromide; alkaline earth metals such as calcium fluoride doped with La, Ce, Gd, Tb, or $CeO_2$; alkali metal azides such as $KN_3$ or $NAN_3$; metallic oxides such as $TiO_2$, $MoO_3$, $WO_3$, $Nb_2O_5$, $Al_2O_3$, ZnO, $HfO_2$, $ThO_2$, $SnO_2$, $Ta_2O_5$, $ZrO_2$, BeO, $GeO_2$, $SiO_2$, MgO, $SrTiO_3$, $CaTiO_3$, $BaTiO_3$, or $MgTiO_3$ which have been doped with Cr, Fe or Ni; or a composition wherein such impurities as Fe, Sb, V, Ag, Cu, Sn, Mg, Zr, or Co have been introduced into a metallic oxide or metallic complex.

The photochromic compound may be combined and used with any of the above.

Applicable as the UV-B absorbing pigment used in the present invention are 2'-ethylhexyl-4-methoxy-cinnamate, 2,4-dinitrophenol or the like, these being applied as the principal UV-B sun protection formulation. Applicable as the UV-A absorbing pigment used in the present invention are 4-t-butyl-4'-methoxy-dibenzoil methane or the like, these being applied as the principal UV-A sun protection formulation.

As explained above, with conventional UV sensors it was difficult to discriminate between UV-A and UV-B; in order to do so, it was necessary to supply such high cost band pass filters as interference filters or the like. Moreover, measurements with conventional UV sensors could not be easily carried out by someone lacking special expertise.

However, if the UV-A, UV-B discriminating sensor according to the present invention is utilized, it becomes possible to easily distinguish between UV-A and UV-B, and, based on the light quantum of UV-A and UV-B, to precisely and correctly use, for example, two types of sun protection formulations. Further, because it is possible, even on a cloudy or rainy day, to know the light quantum of UV-A and UV-B reaching the earth's surface, it becomes possible to take appropriate countermeasures against sunburning.

Further, as compared to conventional UV sensors, the UV-A, UV-B discriminating sensor of the present invention has a thin film form and, moreover, may be formed to any kind of article or building material without requiring selection of a special material or specific surface configuration. Additionally, compared to conventional UV-A, UV-B discriminating sensors, because the print method is utilized, the UV sensor of the present invention may be produced in large quantities, quickly and economically.

As a result, a variety of factors, from the intensity ratio of UV-A and UV-B to the presence or absence of UV, may be easily observed as a change in the color of the photochromic material. Due to its thin film form, the sensor of the present invention does not take up space and, because it is extremely light-weight, by combining it with a variety of articles, it becomes an easy matter to carry the sensor. Accordingly, anyone may easily detect the UV outdoors; one can therefore protect oneself from the increase in UV rays brought about by the depletion of the ozone layer which indicates the growth in the ozone hole in recent years (contributing to, for example, sunburn, skin cancer, cataracts).

DETAILED DESCRIPTION OF THE PREFERRED EMBODIMENTS

The present invention will be more concretely explained below through the use of embodiments; these embodiments, however, are in no way intended to limit the present invention.

EMBODIMENT 1

Figure 1:
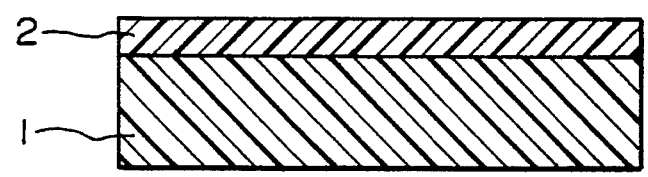
FIG. 1 is a cross-sectional diagram which explains a first embodiment of the UV-A, UV-B discriminating sensor according to the present invention.
Figure 2:
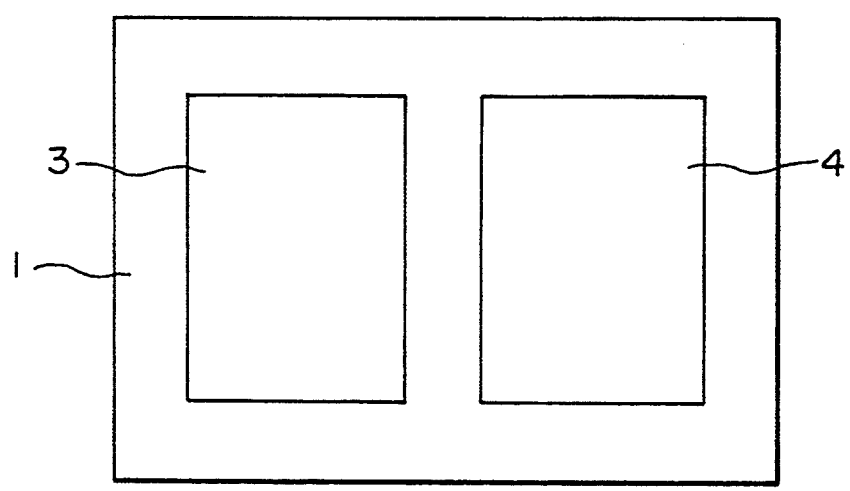
FIG. 2 is a plane diagram of the UV-A, UV-B discriminating sensor shown in FIG. 1 according to the present invention.

FIGS. 1 and 2 are explanatory diagrams of a first embodiment of the present invention, and show the UV-A, UV-B discriminating sensor thereof. FIG. 1 shows a cross-sectional diagram wherein numeral 1 indicates a plastic substrate, and the numeral 2 indicates a poly(methyl methacrylate) (PMMA) layer containing spiro-naphthooxazine, which displays photochromism, and a UV absorbing pigment. FIG. 2 shows a plane diagram wherein numeral 3 is a UV-A sensitive sensor portion, and the numeral 4 is a UV-B sensitive sensor portion.

The following chemical formula 5 shows the molecular structure of spiro-naphthooxazine utilized in the first embodiment and the change in molecular structure which accompanies photochromism.

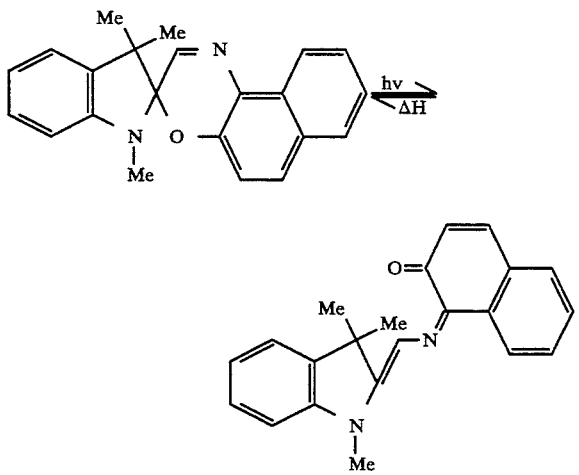

The following chemical formula 6 shows the molecular formula of UV-A absorbing 4-t-butyl-4'-methoxy-dibenzoyl methane, while the following chemical formula 7 shows molecular formula of UV-B absorbing 2'-ethylhexyl-4-methoxy-cinnamate.

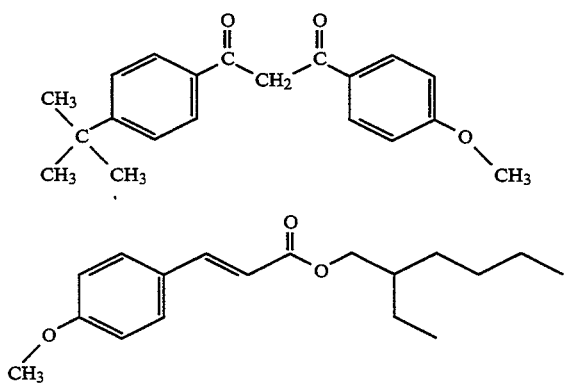

Figure 3:
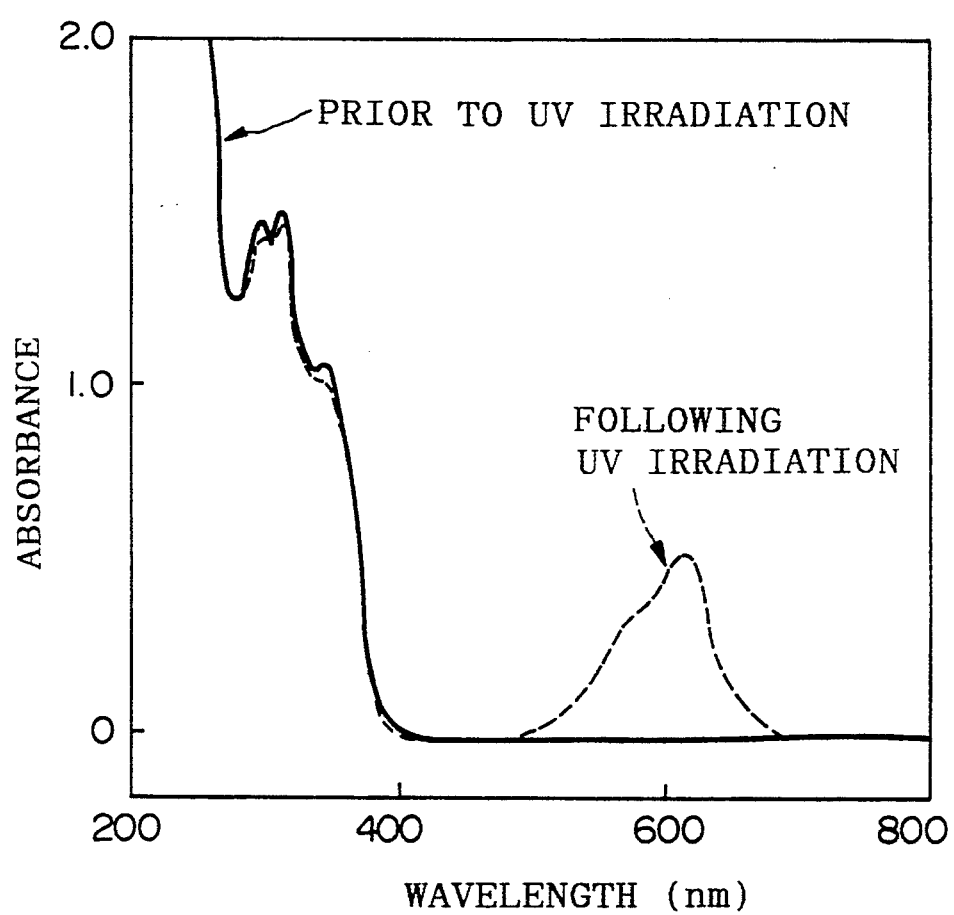
FIG. 3 is diagram of a UV-visible light absorption spectrum wherein a colored glass filter UVD-35 (manufactured by Toshiba Glass Corporation) was provided to a 500 W super high pressure Hg lamp (UI-501C, manufactured by Ushio Inc.), the spectrum showing the photochromic change when spiro-naphthooxazine is simultaneously irradiated with emission lines of wavelength 365 nm, 334 nm, 312 nm, 302 nm, 297 nm and 289 nm.

FIG. 3 is a diagram of a UV-visible light absorption spectrum wherein a colored glass filter UVD-35 (manufactured by Toshiba Glass Corporation) was provided to a 500 W super high pressure Hg lamp (UI-501C, manufactured by Ushio Inc.), the spectrum showing the photochromic change when spiro-naphthooxazine is simultaneously irradiated with emission lines of wavelength 365 nm, 334 nm, 312 nm, 302 nm, 297 nm and 289 nm. The solid line in FIG. 3 indicates the spectrum prior to UV irradiation. The broken line indicates the spectrum, following UV irradiation causing the spiro-naphthooxazine to turn blue.

In FIG. 3, absorbance is shown on the vertical axis and wavelength (nm) is shown on the horizontal axis.

Figure 4:
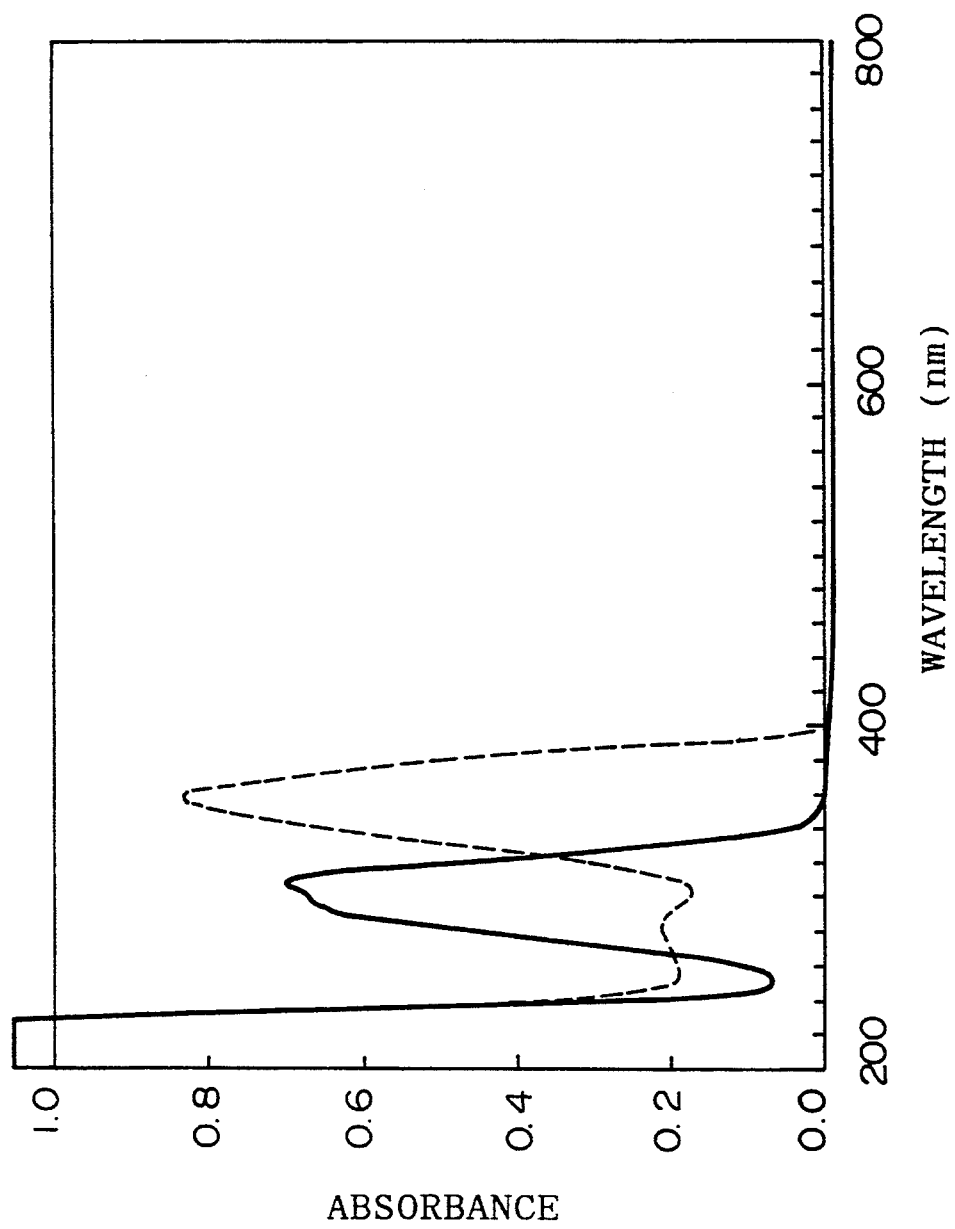
FIG. 4 is a diagram of a UV-visible light absorption spectrum for a pigment which absorbs the UV used in the first embodiment.

FIG. 4 is a diagram of a UV-visible light absorption spectrum for a pigment which absorbs the UV used in the first embodiment. The broken line in FIG. 4 indicates the UV-visible light absorption spectrum of 4-t-butyl-4'-methoxy-dibenzoil methane while the solid line indicates the UV-visible light absorption spectrum of 2'-ethylhexyl-4-methoxy-cinnamate.

In FIG. 4, absorbance is shown on the vertical axis and wavelength (nm) is shown on the horizontal axis.

Next, the production method for the UV-A, UV-B discriminating sensor produced in embodiment 1 will be explained.

Spiro-naphthooxazine in an amount of 5 to 20% by weight with respect to PMMA and a UV-B absorbing pigment (2'-ethylhexyl-4-methoxy-cinnamate) in an amount of 0.5 to 5% by weight with respect to the spiro-naphthooxazine were solubilized in a mixed solution of chlorobenzene and methyl-isobutyl-ketone (MIBK) containing 2 to 20% by weight PMMA (MIBK:chlorobenzene ratio was 1:1), thereby producing a UV sensor solution sensitive to UV-A.

In the same manner, spiro-naphthooxazine in an amount of 5 to 20% by weight with respect to PMMA and a UV-A absorbing pigment (4-t-butyl-4'-methoxy-dibenzoil methane) in an amount of 2% or less by weight with respect to the spiro-naphthooxazine were solubilized in a mixed solution of chlorobenzene and MIBK containing 1 to 20% by weight PMMA (MIBK:chlorobenzene ratio was 1:1), thereby producing a UV Sensor solution sensitive to UV-B.

To the plastic substrate shown in FIG. 2, these solutions were coated in parallel, with the UV sensor solution sensitive to UV-A being coated to UV sensor portion 3 indicated in FIG. 2 and the UV sensor solution sensitive to UV-B being coated to UV sensor portion 4 as shown in FIG. 2, thereby producing the UV-A, UV-B discriminating sensor of the present invention.

A colored glass filter (UV-D35) and an interference filter (KL-36) manufactured by Toshiba Glass Corporation, were provided to a 500 W super high pressure Hg lamp. The UV-A, UV-B discriminating sensor according to the present invention was irradiated with a 365 nm emission line, corresponding to UV-A. As a result, the UV sensor portion 3 shown in FIG. 2 displayed a blue color change identical to the photochromic change shown in FIG. 3. However, UV sensor portion 4 shown in FIG. 2 displayed no change and was not sensitive to 365 nm UV rays, corresponding to UV-A. It was possible to duplicate this change numerous times.

Next, a colored glass filter (UV-D35) and an interference filter (KL-30) manufactured by Toshiba Glass Corporation, were provided to a 500 W super high pressure Hg lamp. The UV-A, UV-B discriminating sensor according to the present invention was irradiated with a 312 nm emission line, corresponding to UV-B. As a result, this time UV sensor portion 3 shown in FIG. 2 displayed no color change. However, UV sensor portion 4 shown in FIG. 2 displayed a blue color change, showing sensitivity to 312 nm UV rays, corresponding to UV-B. It was possible to duplicate this change numerous times.

As is made clear from these results, the UV sensor portion 3 shown in FIG. 2 was not sensitive to UV-B but is sensitive to UV-A, while the UV sensor portion 4 shown in the same figure is not sensitive to UV-A but is sensitive to UV-B. Accordingly, using the UV-A, UV-B discriminating sensor of the present invention, it becomes an easy matter to distinguish the presence or absence and intensity of UV-A and UV-B by comparing the intensity of the color change of UV sensor portions 3 and 4 shown in FIG. 2. It follows from the above that, by means of the UV-A, UV-B discriminating sensor according to the present invention, it becomes possible to discriminate between UV-A and UV-B.

EMBODIMENT 2

A UV-A, UV-B discriminating sensor utilizing inorganic titanium oxide as the photochromic material was produced. For the titanium oxide, LUXELEN, manufactured by Sumitomo Chemical Co., Ltd. was used. 0.2 g of LUXELEN and 1.8 g of the NC lacquer composition shown in the following table were precisely weighed and mixed in a mortar with a pestle for 1 to 1.5 minutes, thereby producing coating solution 1.

TABLE 1

| NC Lacquer Composition (viscosity: approx. 1000 cp) | |
| --- | --- |
| Test Chemical | Composition (%) |
| nitro cellulose | 24.2 |
| isopropyl alcohol | 7.2 |
| isoamyl acetate | 36.0 |
| n-butyl acetate | 30.2 |
| diethylene glycol monobutyl ether | 2.4 |

UV-B absorbing pigment 2'-ethylhexyl-4-methoxycinnamate was mixed in coating solution 1 in the amount of 1 to 10% by weight with respect to the nitrocellulose of the NC lacquer, thereby producing a UV sensor solution sensitive to UV-A.

Next, UV-A absorbing pigment 4-t-butyl-4'-methoxydibenzoil methane was mixed in coating solution 1 in the amount of 1% by weight or less with respect to the nitrocellulose of the NC lacquer, thereby producing a UV sensor solution sensitive to UV-B.

Using a screen printer, the thus produced solutions were respectively coated in parallel to two positions on both surfaces of Art paper in the same manner as shown in FIG. 2 of the first embodiment.

The thus produced inorganic UV sensor was irradiated with UV-A and UV-B in the same manner as carried out in the first embodiment. From this the same results were obtained as for the first embodiment. Even when utilizing an inorganic photochromic compound, it was an easy matter to distinguish the presence or absence and the intensity of UV-A and UV-B.

EMBODIMENT 3

Figure 5:
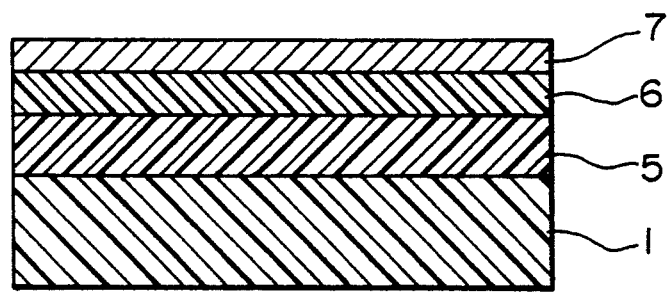
FIG. 5 is a cross-sectional diagram showing an embodiment of the UV-A, UV-B discriminating sensor according to the present invention.

FIG. 5 is an explanatory diagram of an embodiment of the present invention and shows a cross-sectional diagram of the UV-A, UV-B discriminating sensor of the present invention. The numeral 1 in FIG. 5 indicates a plastic substrate. The numeral 5 indicates PMMA spin coat layer containing spiro-naphthooxazine which displays photochromism. The numeral 6 indicates 2,4-dinitrophenol layer which absorbs light of greater than or equal to 280 nm but less than or equal to 320 nm. The numeral 7 indicates a MgF$_2$ protective layer which does not absorb ultraviolet or visible light rays.

The molecular structure of 2,4-dinitrophenol is shown by the following chemical formula 8.

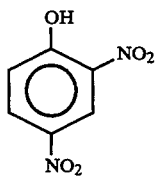

Figure 7:
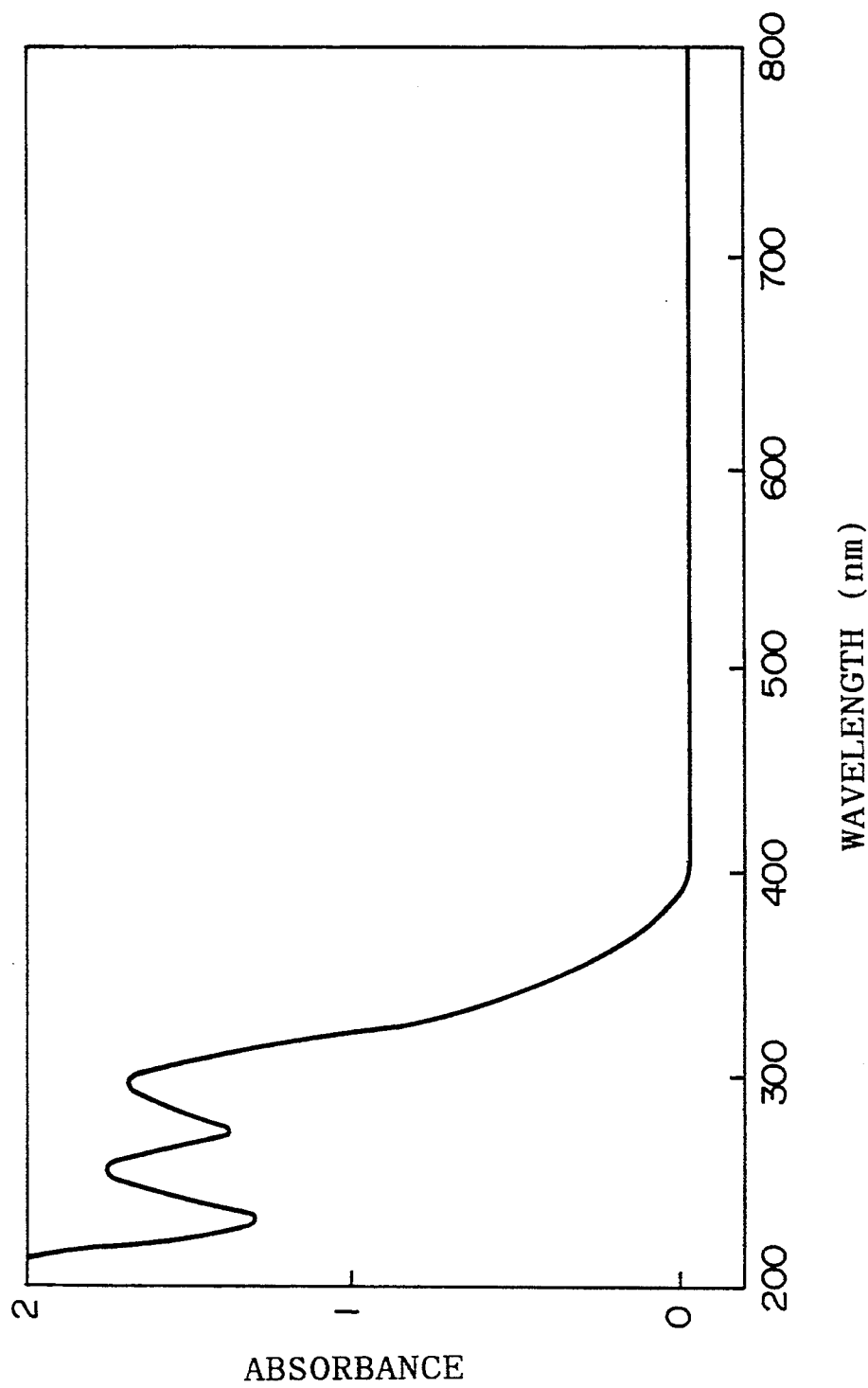
FIG. 7 is a diagram of a UV-visible light absorption spectrum for 2,4-dinitrophenol.

FIG. 7 is a diagram of the UV-visible light absorption spectrum for 2,4-dinitrophenol. In FIG. 7, absorbance is shown on the vertical axis and wavelength (nm) is shown on the horizontal axis.

Next, the production method for the UV-A, UV-B discriminating sensor produced in embodiment 3 will be explained.

Spiro-naphthooxazine in an amount of 5 to 20% by weight with respect to PMMA and a MIBK solution of PMMA were spin coated on to a plastic substrate at 1000 to 5000 rpm. On top of this an ethanol solution of 2,4-dinitrophenol was spin coated under the same conditions. Additionally, on top of this, MgF$_2$ was deposited as a protective layer which permits UV transmission and does not absorb visible light; this vacuum deposition was carried out at $1 \times 10^5$ Torr with a coating speed of 0.2 to 2 nm/second, thereby producing the UV-A, UV-B discriminating sensor according to the present invention.

As a comparative example, a UV sensor not containing a 2,4-dinitrophenol layer was produced under the same conditions as above.

UV light from a 500 W super high pressure Hg lamp was passed through a monochrometer (G250), manufactured by Nikon Corporation, and the UV sensor according to the present invention and the UV sensor produced for comparative purposes were irradiated with a 312 nm only emission line, corresponding to UV-B.

As a result, the UV sensor produced for comparative purposes displayed a blue color change identical to the photochromic change shown in FIG. 3. The UV sensor according the present invention, having a filter layer, showed no detectable change and was not sensitive to 312 nm UV corresponding to UV-B.

Moreover, when UV irradiation of the UV sensor produced for comparative purposes was terminated, the sensor immediately returned to its colorless state. It was possible to duplicate this change numerous times.

EMBODIMENT 4

Figure 6:
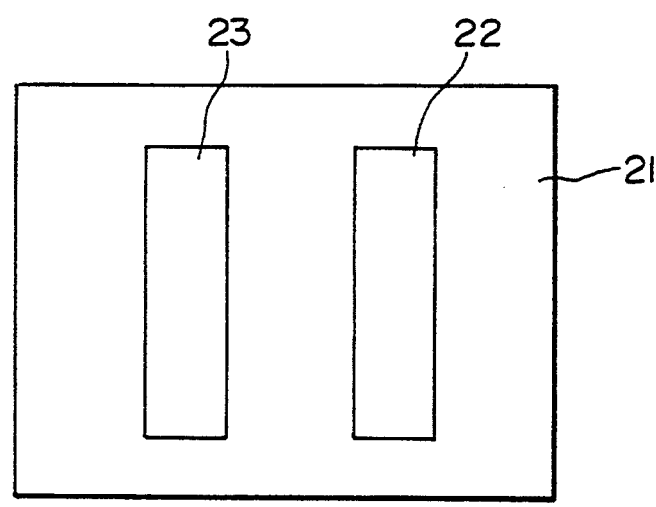
FIG. 6 is a diagram showing an embodiment of the UV-A, UVB discriminating sensor according to the present invention.

FIG. 6 is an explanatory diagram of an embodiment of the present invention and shows the UV-A, UV-B discriminating sensor according to the present invention. The numeral 21 in FIG. 6 indicates a plastic substrate. The numeral 22 indicates the UV sensor portion produced in embodiment 3. The numeral 23 indicates a UV sensor portion produced for comparative purposes.

A 500 W super high pressure Hg lamp and a monochrometer (G250) manufactured by Nikon Corporation were combined with the UV-A, UV-B discriminating sensor according to the present embodiment, and were irradiated with an emission line of 365 nm, corresponding to UV-A. As a result, UV sensor portions 22 and 23 shown in FIG. 6 displayed a blue color change of approximately the same density. Next, simultaneous irradiation with an emission line of 312 nm from another light source was carried out. Accordingly, the conditions established were such that the UV-A, UV-B discriminating sensor according to the present invention was irradiated with two types of UV light, one of 365 nm and one of 312 nm. Under these conditions, UV sensor portion 23 shown in FIG. 6 and prepared for comparative purposes, displayed a greater blue color change than UV sensor portion 22. Further, when UV irradiation of the UV sensor was terminated, the sensor immediately returned to its colorless state. It was possible to .duplicate this change numerous times.

As is clear from these results, as was stated for embodiment 3, the UV sensor portion 22 in FIG. 6 is not sensitive to UV-B but is sensitive to UV-A. Accordingly, if the UV-A, UV-B discriminating sensor according to the present invention is utilized, it is an easy matter to distinguish the presence or absence and intensity of UV-A and UV-B by comparing the intensity of coloring with that of the UV sensor prepared for comparative purposes.

EMBODIMENT 5

Figure 8:
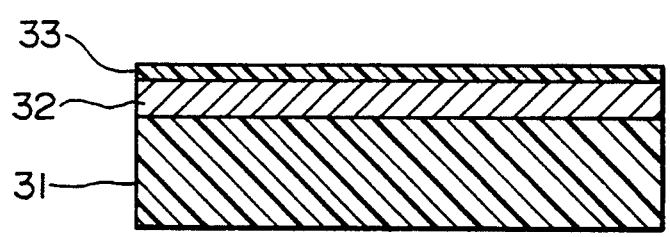
FIG. 8 is a cross-sectional diagram showing an embodiment of the UV-A, UV-B discriminating sensor according to the present invention.
Figure 9:
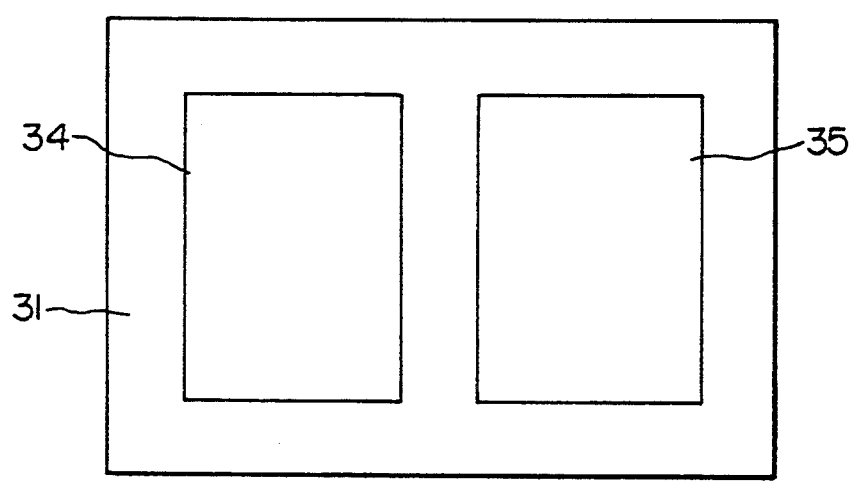
FIG. 9 is a plane diagram of the UV-A, UV-B discriminating sensor shown in FIG. 8 according to the present invention.

FIGS. 8 and 9 are explanatory diagrams of an embodiment of the present invention and show the UV-A, UV-B discriminating sensor of the present invention. FIG. 8 is a cross-sectional diagram wherein the numeral 31 indicates a blank white telephone card; numeral 32 indicates a titanium oxide layer which displays photochromism; and numeral 33 indicates a PMMA layer containing a pigment which absorbs UV. FIG. 9 is a diagram showing a plan view of FIG. 8 wherein the numeral 34 indicates a titanium oxide layer covered with PMMA containing 2'-ethylhexyl-4-methoxy cinnamate which absorbs UV-B; the numeral 35 is a titanium oxide layer covered with PMMA containing 4-t-butyl-4'-methoxy-dibenzoil methane which primarily absorbs UV-A.

Next, an explanation of the method of production will be made. Using a screen printer, coating solution 1 of titanium oxide prepared in embodiment 2 was coated to two spots on the surface of a blank white telephone card in the same manner as is shown in FIG. 2 of the first embodiment. The coated spot on the left was coated with a solution wherein 2'-ethylhexyl-4-methoxy-cinnamate, which is a UV-B absorbing sun protection formulation, had been blended with PMMA in an amount of 1.15% by weight with respect to the PMMA and dissolved in MIBK. The remaining coated spot on the right was coated with a solution wherein 4-t-butyl-4'-methoxy-dibenzoil methane, which has a transmission rate for UV-B which is about three time that for UV-A and which is a sun protection formulation primarily absorbing UV-A, had been blended with PMMA in an amount of 0.87% by weight with respect to the PMMA and was dissolved in MIBK. Thus, a UV-A, UV-B discriminating sensor was produced wherein the UV sensor portions which discriminate between UV-A and UV-B were disposed in parallel.

The thus produced inorganic UV-A, UV-B discriminating sensor was irradiated with an emission line of 365 nm, corresponding to UV-A, in the same manner as carried out in embodiment 1. As a result, the portion coated with the PMMA solution containing UV-B absorbing 2'-ethylhexyl-4-methoxy-cinnamate changed from colorless to grayish blue, however, no change occurred in the portion coated with the PMMA solution containing primarily UV-A absorbing 4-t-butyl-4'-methoxy-dibenzoil methane. Next, upon irradiation with an emission line of 312 nm, corresponding to UV-B, the portion coated with the UV-B absorbing pigment showed no change, however, the portion coated with the primarily absorbing UV-A pigment changed from colorless to grayish blue. It was possible to duplicate this change numerous times. It was therefore possible to distinguish between UV-A and UV-B.

EMBODIMENT 6

Mixed together were E-α-(2,5-dimethyl-3-furyl ethylidene)-(adamantylidene)-succinic anhydride (abbreviated hereafter as "AF") in an amount of 5 to 20% by weight with respect to PMMA, and a UV-B absorbing pigment (2'-ethylhexyl-4-methoxy-cinnamate) in an amount of 0.5 to 5% by weight with respect to AF. E-α-(2,5-dimethyl-3-furyl ethylidene )-(adamantylidene)-succinic anhydride is shown by the following chemical formula 9. A UV sensor sensitive to UV-A was produced using the hot-melt method.

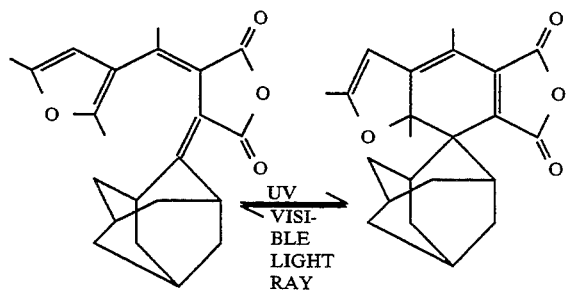

In the same manner, AF in the amount of 5 to 20% by weight with respect to PMMA and a UV-A absorbing pigment (4-t-butyl-4'-methoxy-dibenzoil methane) in an amount of 2% by weight or less with respect to AF were mixed together. A UV sensor sensitive to UV-B was thereby produced using the hot-melt method.

The thus produced UV-A, UV-B discriminating sensor was irradiated with UV-A and UV-B in the same manner as carried out in embodiment 1. As a result, the same results as obtained for the first embodiment were obtained. It therefore became an easy matter to distinguish the presence or absence and intensity of UV-A and UV-B.

EMBODIMENT 7

PMMA, spiro-naphthooxazine in the amount of 5 to 20% by weight with respect to the PMMA, and a UV-B absorbing pigment (2,ethylhexyl-4-methoxy-cinnamate) in the amount of 1 to 5% by weight with respect to the spiro-naphthooxazine was solubilized in a mixed solvent of MIBK and chlorobenzene (1:1), thereby producing a UV sensor solution sensitive to UV-A.

In the same manner, PMMA, AF in the amount of 5 to 20% by weight with respect to the PMMA, and a UV-A absorbing pigment (4-t-butyl-4'-methoxy-dibenzoil methane) in the amount of 1% by weight or less with respect to AF was solubilized in the aforementioned mixed solvent, there by producing a UV sensor solution sensitive to UV-B.

These solutions were coated in parallel respectively to two spots in the same manner as is shown by FIG. 2 of the first embodiment, thereby producing a UV-A, UV-B discriminating sensor.

The thus produced sensor was irradiated with light corresponding to UV-A and UV-B respectively, in the same manner as carried out in the first embodiment. Upon irradiation with UV-A, the spiro-naphthooxazine displayed a blue color change; irradiation with UV-B produced a red color change in AF. It was possible to duplicate this change numerous times. Therefore, it was possible to clearly discriminate between UV-A and UV-B.

EMBODIMENT 8

Figure 10:
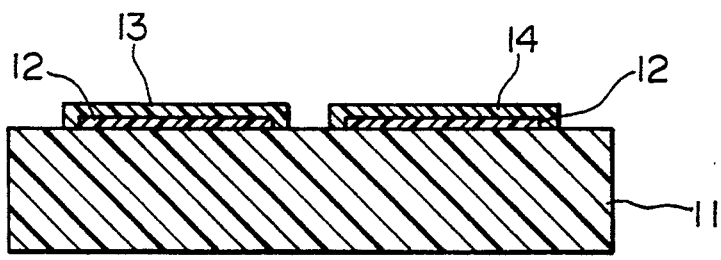
FIG. 10 is a cross-sectional diagram of a UV-A, UV-B discriminating sensor formed to a compact.
Figure 11:
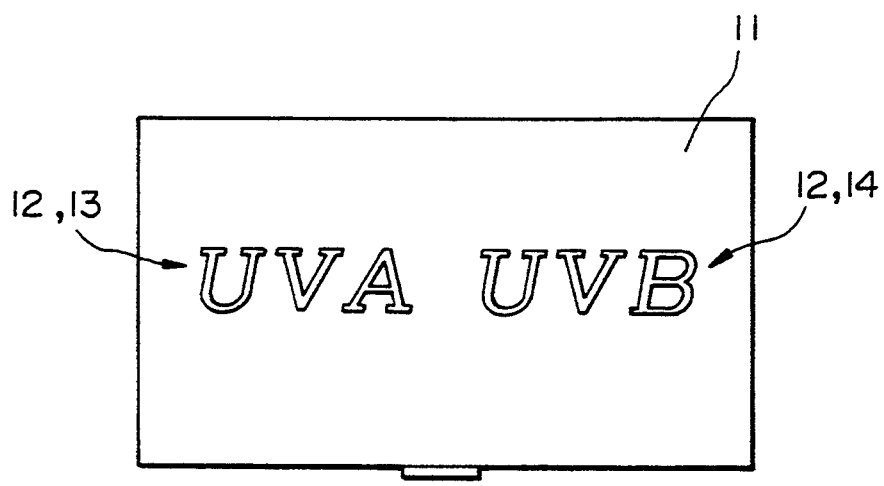
FIG. 11 is a diagram of a top view of FIG. 10.

FIG. 10 is a cross-sectional diagram of the structure of first example of the UV-A, UV-B discriminating sensor according to the present invention. FIG. 11 is a top view of FIG. 10 wherein the numeral 11 indicates a substrate, the numeral 12 indicates letters formed in photochromic material, the numeral 13 indicates a UV-B absorbing mat material and the numeral 14 indicates a UV-A absorbing mat material. An example utilizing a compact as the substrate follows below, however, this is not intended to limit the present embodiment in any way. For any reference below made to the figures, the numerals 12 to 14 shall be as taken to be as defined above.

For the production of the UV-A, UV-B discriminating sensor of the present example, printing ink containing a photochromic material was utilized to print the letters "UVA" and "UVB" on the surface of the compact by the screen print method. Next, in order that the photochromic printed letters "UVA" display a blue color change when irradiated with UV-A, using the screen print method, a UV-B absorbing mat material 13 was printed to slightly overlap the printed characters "UVA". Further, in order that the photochromic printed characters "UVB" display a blue color change when irradiated with UV-B, using the screen print method, a UV-A absorbing mat material 14 was printed to slightly overlap the printed characters "UVB".

Figure 12:
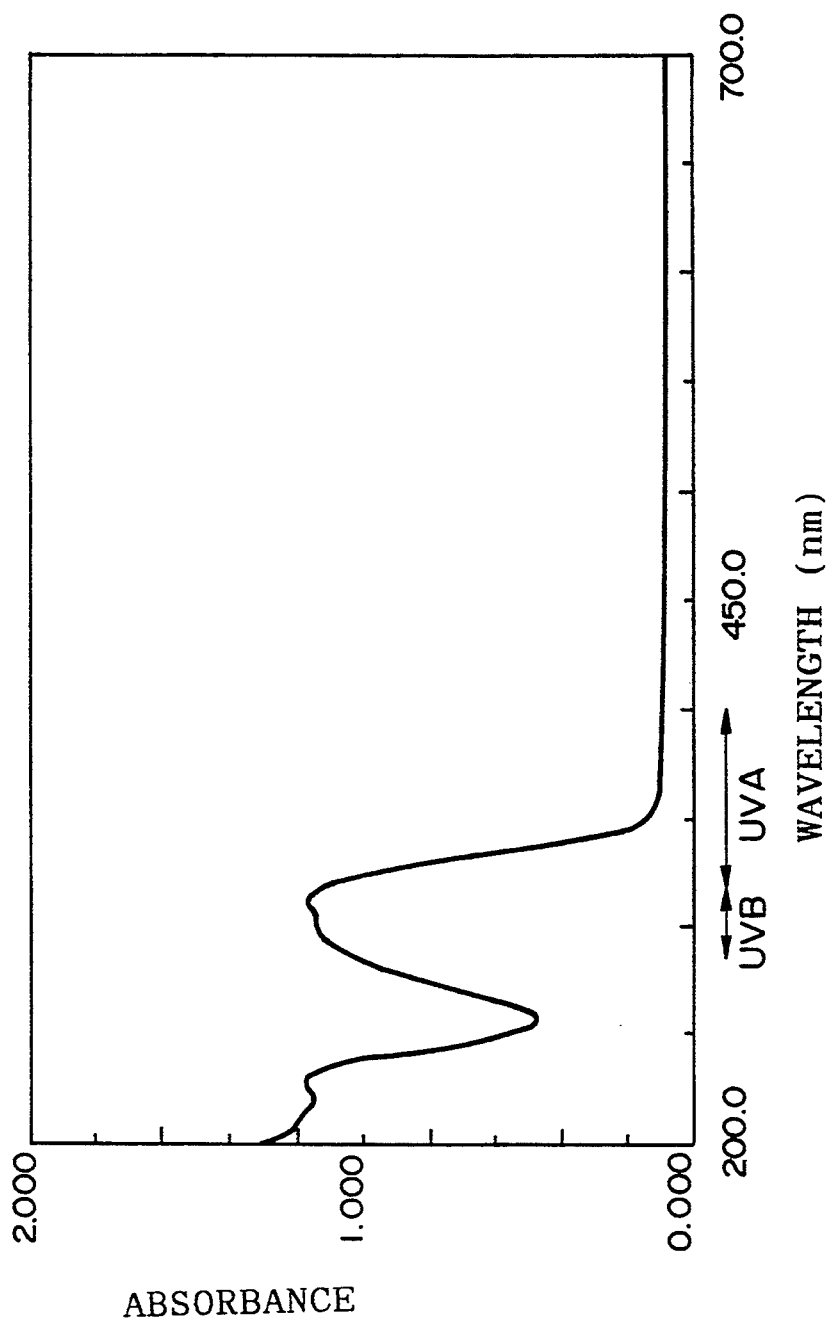
FIG. 12 is a diagram of a UV-visible light absorption spectrum for a UV-B absorbing mat material.
Figure 13:
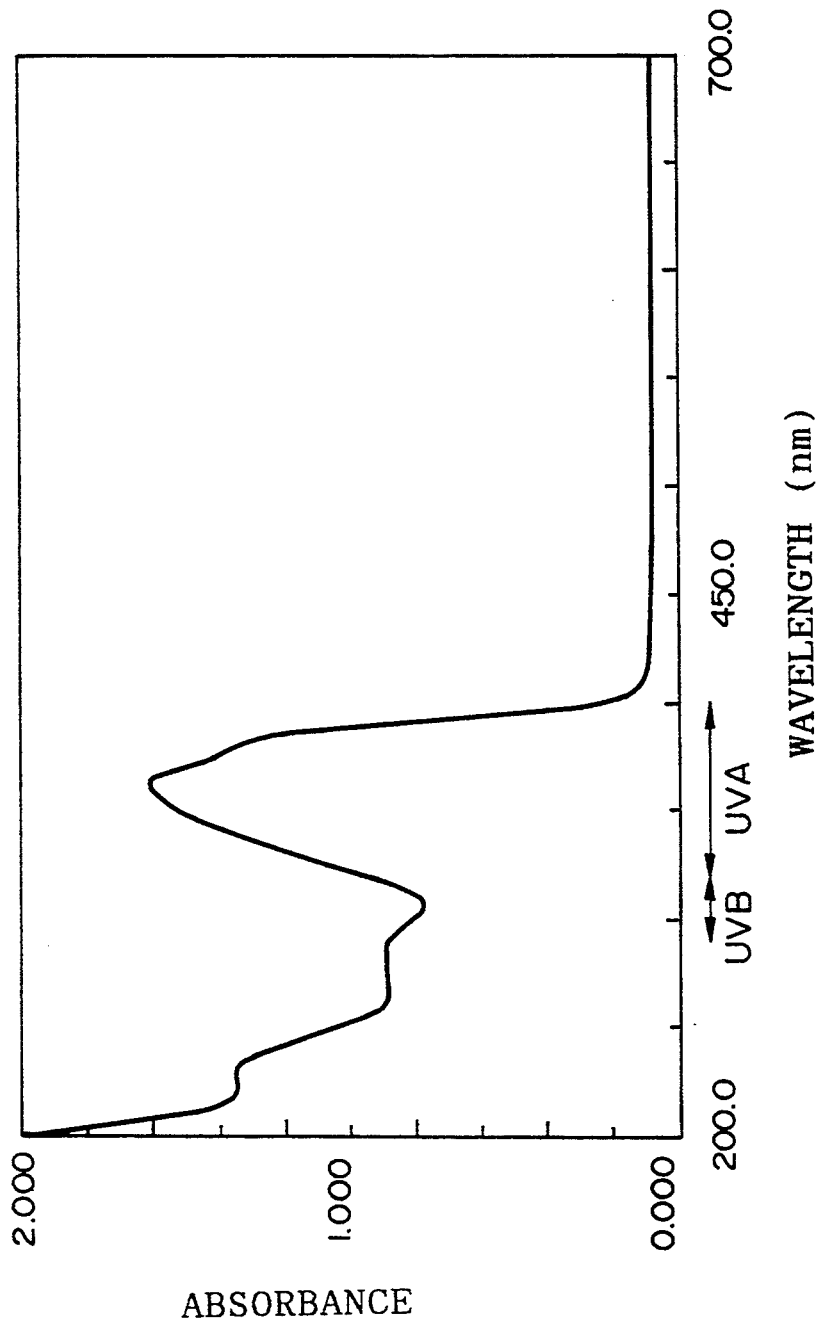
FIG. 13 is a diagram of a UV-visible light absorption spectrum for a UV-A absorbing mat material.

FIG. 12 shows a diagram of the UV-visible light absorption spectrum for the UV-B absorbing mat material 13 (film thickness: 12 $\mu$m). FIG. 13 shows a diagram of the UV-visible light absorption spectrum for the UV-A absorbing mat material 14 (film thickness: 10 $\mu$m). In FIGS. 12 and 13, absorbance is shown on the vertical axis and wavelength (nm) is shown on the horizontal axis.

In this way, due to provision of a mat material which corresponds to a UV band pass filter on top of the photo chromic material, UV-A light is transmitted through the letters "UVA," and UV-B light is transmitted through the letters "UVB," and, by the reaction of the photochromic material to the light, a color change from white to blue occurs.

In the thus produced UV-A, UV-B discriminating sensor, the color of the letters changes from white to blue due to the UV-A and UV-B which is contained of sunlight. When only the letters "UVA" turn blue, this indicates that UV-A is reaching the earth's surface, while UV-B is almost non-existent. On the other hand, during summer, serious sunburns, due to prolonged exposure to the sun at the beach or mountains where UV rays are particularly strong, are not uncommon occurrences. In such a locality, both the "UVA" and "UVB" letters would change color from white to blue.

In order to confirm the performance of this sensor, a water filter which cuts the near-infrared and a 350 nm band pass filter which transmits UV-A were placed in the path of the light from a super high pressure Hg lamp, and the letters "UVA" on the compact were irradiated. The letters "UVA" changed to a dark blue. Next, when the letters "UVB" were irradiated, there was a very faint color change to blue which was, however, discernible under careful observation. This change was due to the UV-A which passed through to letters "UV-B."

Next, upon exposure of the sensor to outside conditions, in the middle of the month of April at 1 pm on a fine day, at a position separated 1 km from the shoreline of the Pacific Ocean, the letters "UVA" changed to a dark blue and the letters "UVB" changed color to a light blue. In contrast, an investigation of the color change on a cloudy day during the same time and season revealed that the letters "UVA" turned blue while the letters "UVB" turned very slightly blue. As for the daily changes in UV intensity, UV was at its strongest when the sensor was placed horizontally level on a clear day between the hour of 11 am to 12 pm (total UV-A and UV-B: 4 mw/cm$^2$). From the evening hour of 5 o'clock, the UV intensity decreased to 1/10 of its maximum value. Irradiating the sensors with direct sunlight at 5 pm revealed that neither the letters "UVA" nor "UVB" changed color. Further, neither set of letters displayed any color change upon exposure to indoor fluorescent lighting.

EMBODIMENT 9

Figure 14:
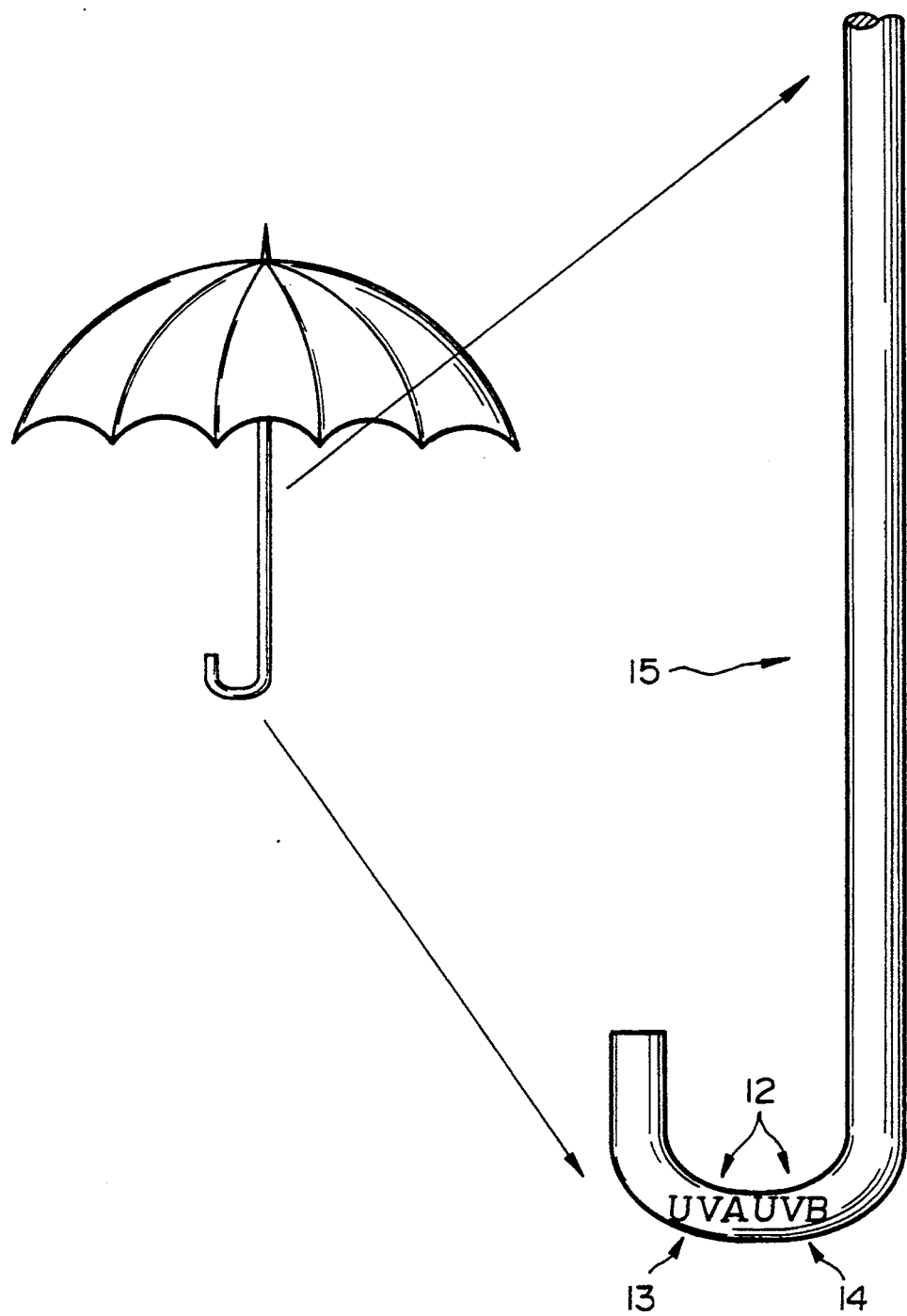
FIG. 14 is a structural diagram of a UV-A, UV-B discriminating sensor formed on the handle of a sun umbrella.

FIG. 14 is a structural diagram of one example of the UV-A, UV-B discriminating sensor according to the present invention and shows one example of a position of formation of the sensor, with the sensor portion being enlarged. The numeral 15 indicates the substrate (handle of a sun umbrella).

Using the print method, UV-A, UV-B discriminating sensors, "UVA" and "UVB" having the same construction as in embodiment 8 were produced on the curved surface of a plastic umbrella handle which was used as the sensor substrate. Performance was approximately identical to that in embodiment 8.

EMBODIMENT 10

Figure 15:
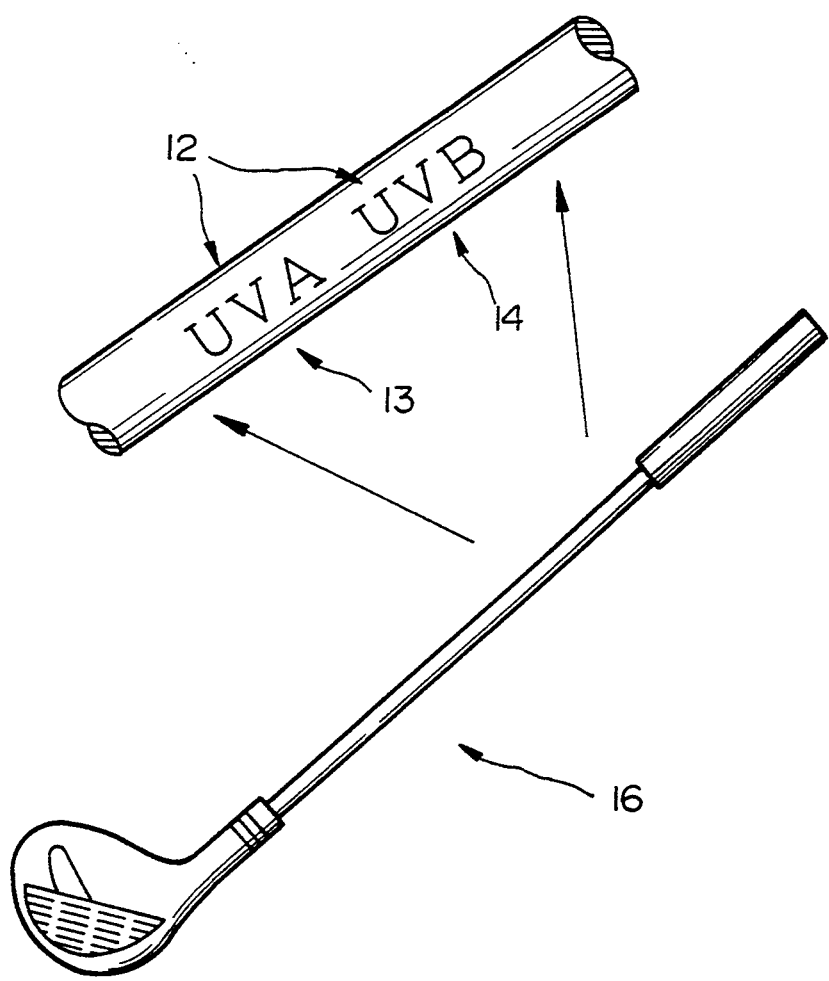
FIG. 15 is a structural diagram of a UV-A, UV-B discriminating sensor formed on the shaft of a golf club.

FIG. 15 is a structural diagram of one example of the UV-A, UV-B discriminating sensor according to the present invention and shows one example of a position of formation of the sensor, with the sensor portion being enlarged. The numeral 16 indicates the substrate (shaft of a golf club).

Using the print method, UV-A, UV-B discriminating sensors, "UVA" and "UVB", having the same construction as in embodiment 8 were produced on the curved surface of a golf club shaft which was used as the sensor substrate and was formed from a metallic complex. Performance was approximately identical to that in embodiment 8.

EMBODIMENT 11

Figure 16:
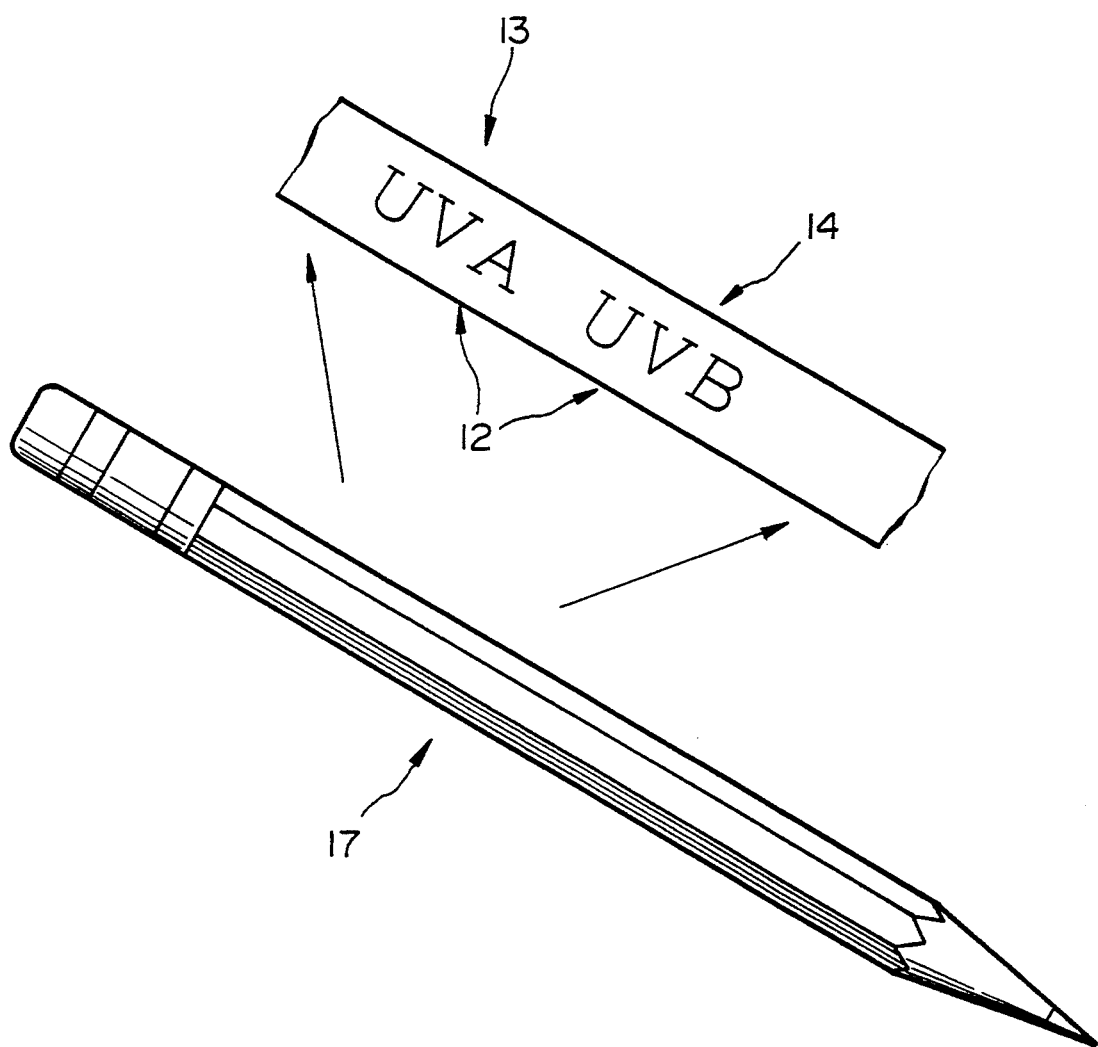
FIG. 16 is a structural diagram of a UV-A, UV-B discriminating sensor formed on a pencil.

FIG. 16 is a structural diagram of one example of the UV-A, UV-B discriminating sensor according to the present invention and shows one example of a position of formation of the sensor, with the sensor portion being enlarged. The numeral 17 indicates the substrate (pencil).

Using the print method, UV-A, UV-B discriminating sensors, "UVA" and "UVB" having the same construction as in embodiment 8 were produced on top of the square, flat, painted wooden surface of the pencil, which was used as the sensor substrate. Performance was approximately identical to that in embodiment 8.

EMBODIMENT 12

Figure 17:
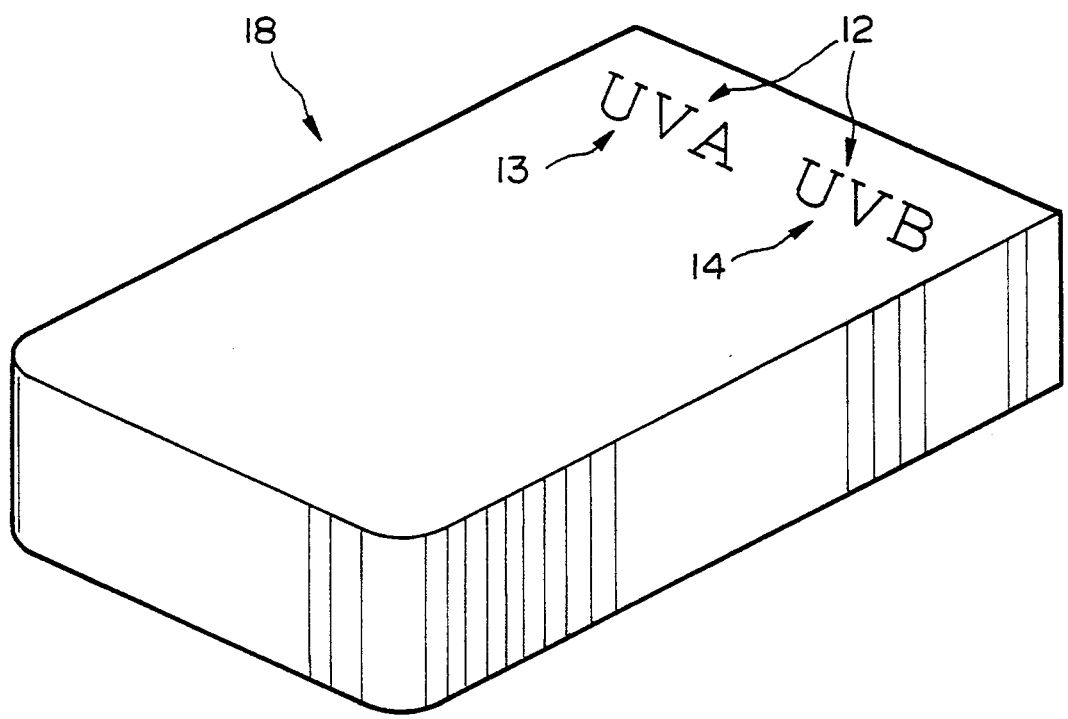
FIG. 17 is a structural diagram of a UV-A, UV-B discriminating sensor formed on an eraser.

FIG. 17 is a structural diagram of one example of the UV-A, UV-B discriminating sensor according to the present invention and shows one example of a position of formation of the sensor, with the sensor portion being enlarged. The numeral 18 indicates the substrate (eraser).

Using the print method, UV-A, UV-B discriminating sensors, "UVA" and "UVB" having the same construction as in embodiment 8 were produced on the flat, rubber surface of an eraser which was used as the sensor substrate. Performance was approximately identical to that in embodiment 8.

EMBODIMENT 13

Figure 18:
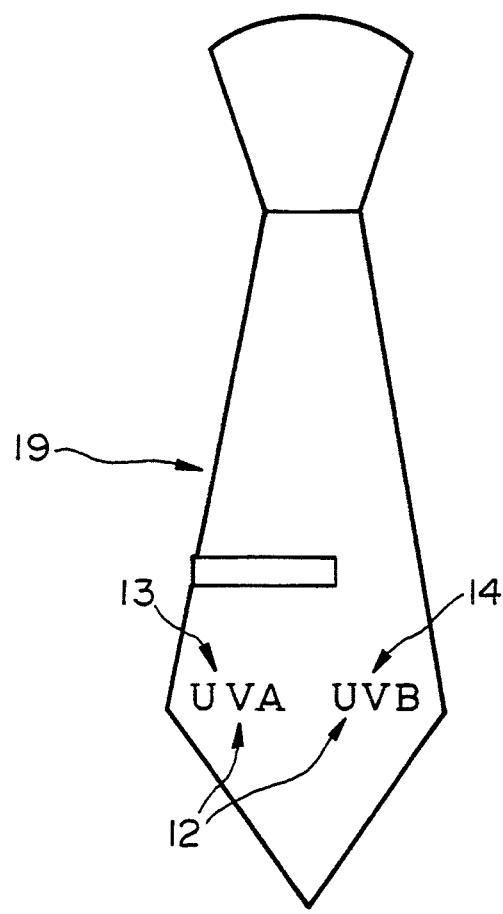
FIG. 18 is a structural diagram of a UV-A, UV-B discriminating sensor formed on a necktie.

FIG. 18 is a structural diagram of one example of the UV-A, UV-B discriminating sensor according to the present invention and shows one example of a position of formation of the sensor, with the sensor portion being enlarged. The numeral 19 indicates the substrate (necktie).

Using the print method, UV-A, UV-B discriminating sensors, "UVA" and "UVB" having the same construction as in embodiment 8 were produced on the cloth material of the necktie which was used as the sensor substrate. Performance was approximately identical to that in embodiment 8.

EMBODIMENT 14

Figure 19:
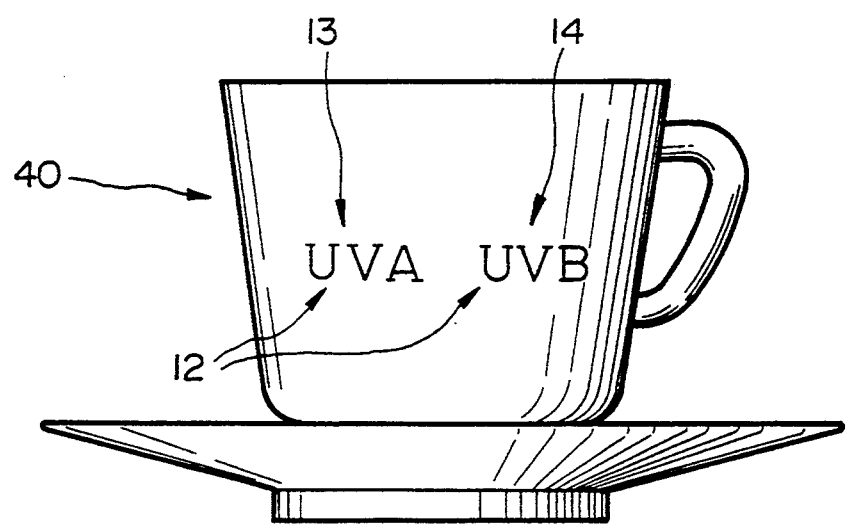
FIG. 19 is a structural diagram of a UV-A, UV-B discriminating sensor formed on the outside surface of a coffee cup.

FIG. 19 is a structural diagram of one example of the UV-A, UV-B discriminating sensor according to the present invention and shows one example of a position of formation of the sensor, with the sensor portion being enlarged. The numeral 40 indicates the substrate (side of coffee cup).

Using the print method, UV-A, UV-B discriminating sensors, "UVA" and "UVB" having the same construction as in embodiment 8 were produced on the curved ceramic surface of a coffee cup which was used as the sensor substrate. Performance was approximately identical to that in embodiment 8.

EMBODIMENT 15

Figure 20:
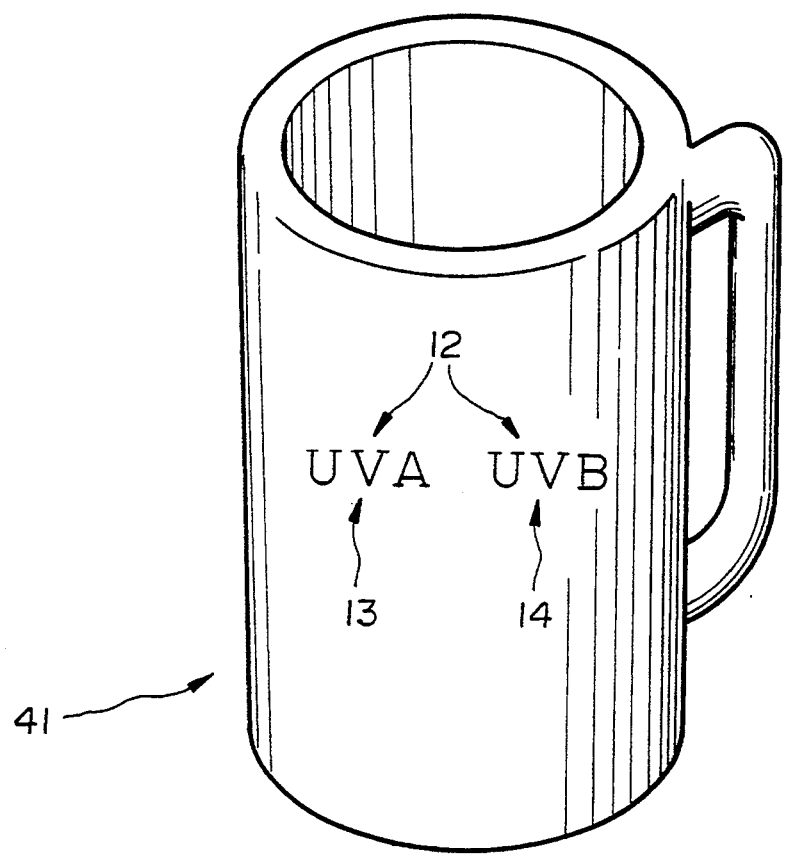
FIG. 20 is a structural diagram of a UV-A, UV-B discriminating sensor formed on a beer mug.

FIG. 20 is a structural diagram of one example of the UV-A, UV-B discriminating sensor according to the present invention and shows one example of a position of formation of the sensor, with the sensor portion being enlarged. The numeral 41 indicates the substrate (beer mug).

Using the print method, UV-A, UV-B discriminating sensors, "UVA" and "UVB", having the same construction as in embodiment 8 were produced on the slightly irregular, curved glass surface of a beer mug which was used as the sensor substrate. Performance was approximately identical to that in embodiment 8.

EMBODIMENT 16

Figure 21:
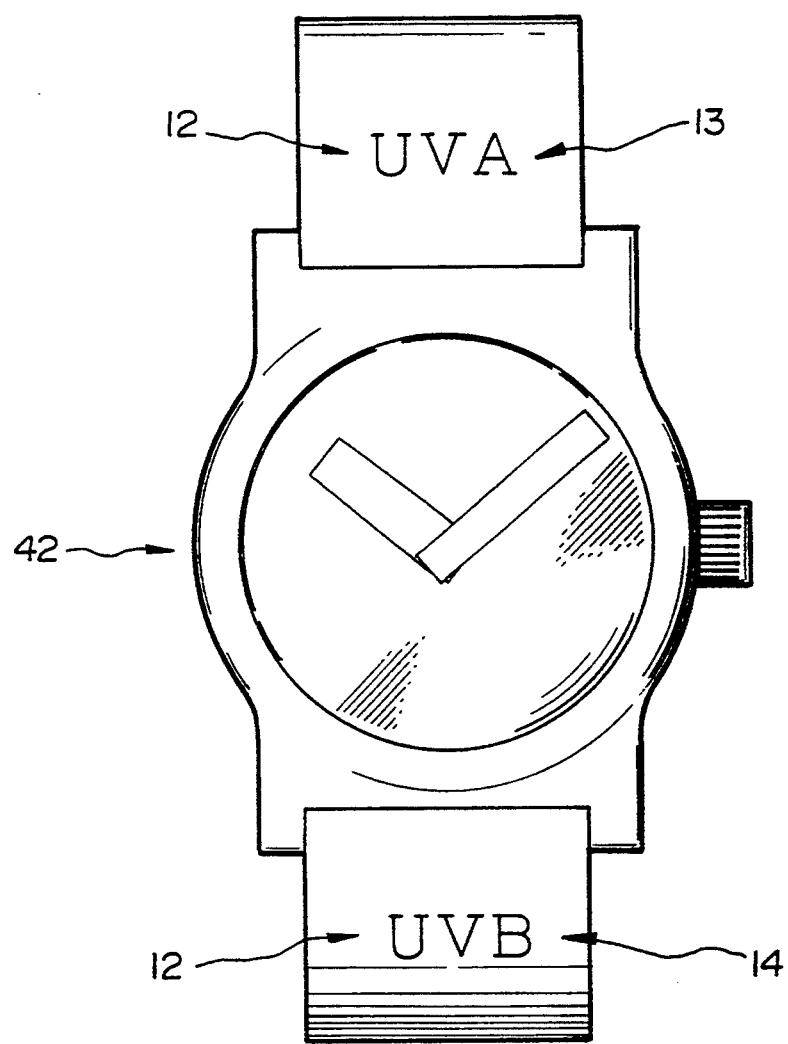
FIG. 21 is a structural diagram of a UV-A, UV-B discriminating sensor formed on the leather wristband of a wrist watch.

FIG. 21 is a structural diagram of one example of the UV-A, UV-B discriminating sensor according to the present invention and shows one example of a position of formation of the sensor, with the sensor portion being enlarged. The numeral 42 indicates the substrate (leather band of a wristwatch).

Using the print method, UV-A, UV-B discriminating sensors, "UVA" and "UVB", having the same construction as in embodiment 8 were produced on the leather surface of a wristwatch band which was used as the sensor substrate. Performance was approximately identical to that in embodiment 8.

EMBODIMENT 17

Figure 22:
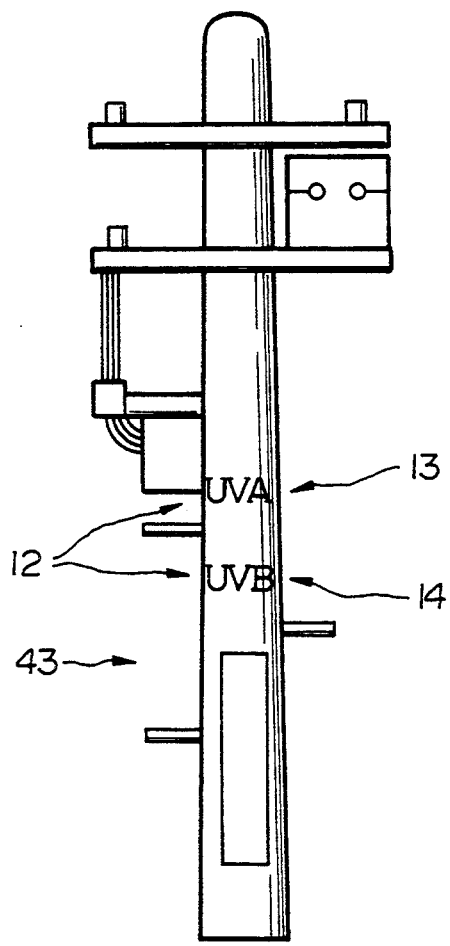
FIG. 22 is a structural diagram of a UV-A, UV-B discriminating sensor formed on a concrete electric pole.

FIG. 22 is a structural diagram of one example of the UV-A, UV-B discriminating sensor according to the present invention and shows one example of a position of formation of the sensor, with the sensor portion being enlarged. The numeral 43 indicates the substrate (concrete telephone pole).

Using the print method, UV-A, UV-B discriminating sensors, "UVA" and "UVB" having the same construction as in embodiment 8 were produced on the curved concrete surface of a telephone pole which was used as the sensor substrate. Performance was approximately identical to that in embodiment 8.

EMBODIMENT 18

Figure 23:
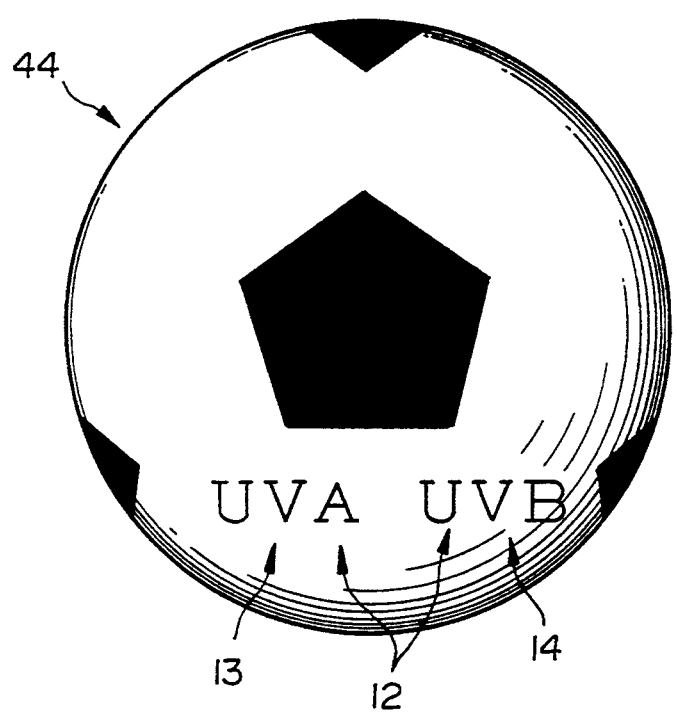
FIG. 23 is a structural diagram of a UV-A, UV-B discriminating sensor formed on a soccer ball.

FIG. 23 is a structural diagram of one example of the UV-A, UV-B discriminating sensor according to the present invention and shows one example of a position of formation of the sensor, with the sensor portion being enlarged. The numeral 44 indicates the substrate (soccer ball).

Using the print method, UV-A, UV-B discriminating sensors, "UVA" and "UVB" having the same construction as in embodiment 8 were produced on the slightly irregular spherical surface of a soccer ball which was used as the sensor substrate. Performance was approximately identical to that in embodiment 8.

EMBODIMENT 19

Figure 24:
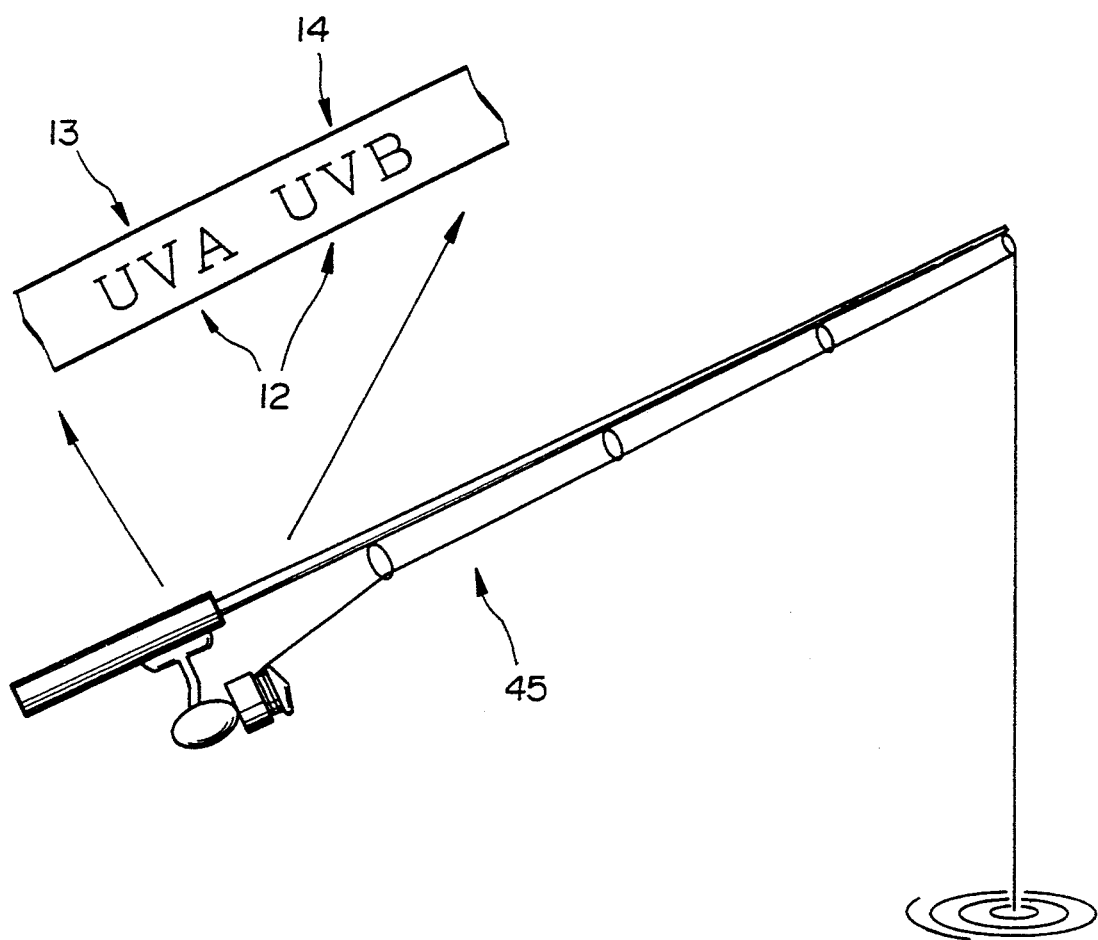
FIG. 24 is a structural diagram of a UV-A, UV-B discriminating sensor formed on a fishing rod.

FIG. 24 is a structural diagram of one example of the UV-A, UV-B discriminating sensor according to the present invention and shows one example of a position of formation of the sensor, with the sensor portion being enlarged. The numeral 45 indicates the substrate (fishing rod).

Using the print method, UV-A, UV-B discriminating sensors, "UVA" and "UVB", having the same construction as in embodiment 8 were produced on the curved carbon fiber surface of a fishing rod which was used as the sensor substrate. Performance was approximately identical to that in embodiment 8.

EMBODIMENT 20

Figure 25:
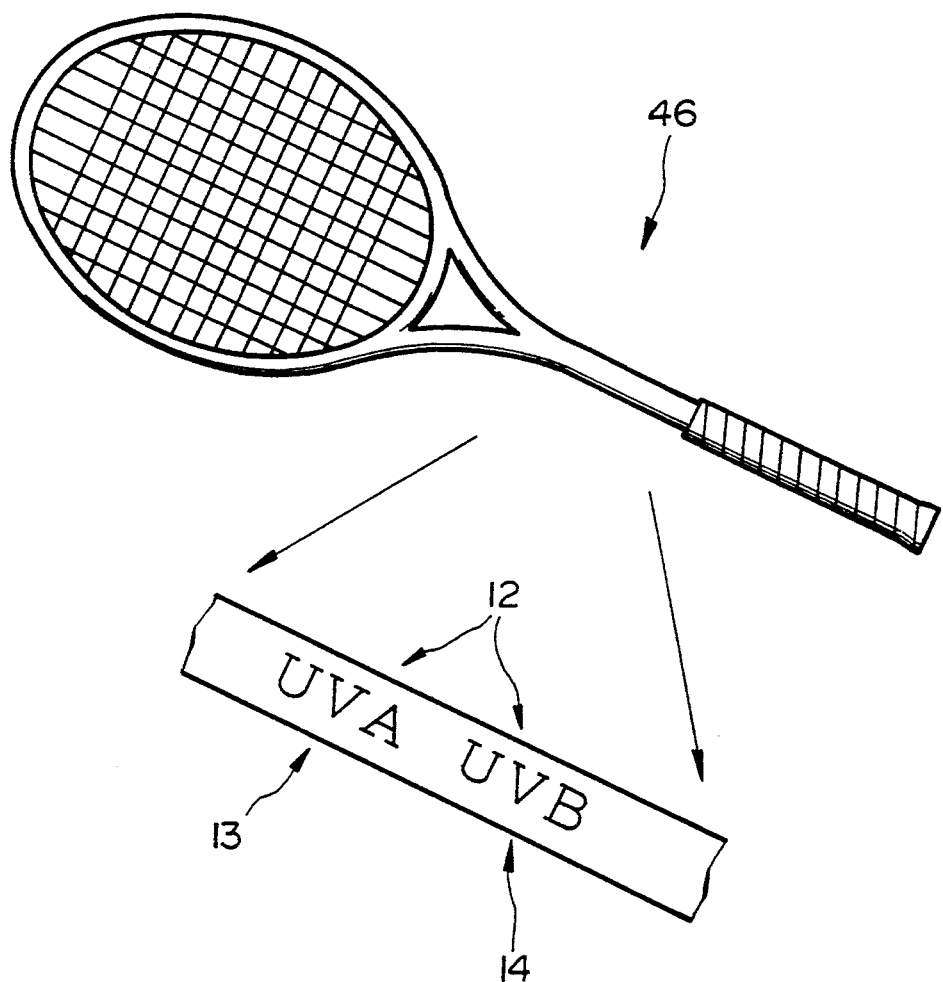
FIG. 25 is a structural diagram of an UV-A, UV-B discriminating sensor formed on tennis racket.

FIG. 25 is a structural diagram of one example of the UV-A, UV-B discriminating sensor according to the present invention and shows one example of a position of formation of the sensor, with the sensor portion being enlarged. The numeral 46 indicates the substrate (tennis racket).

Using the print method, UV-A, UV-B discriminating sensors, "UVA" and "UVB" having the same construction as in embodiment 8 were produced on the slightly irregular curved surface of a tennis racket which was used as the sensor substrate. Performance was approximately identical to that in embodiment 8.

EMBODIMENTS 21 THROUGH 68

Using the print method, UV-A, UV-B discriminating sensors were printed on an article or structure. The successful production of a high functioning UV-A, UV-B discriminating sensor became clear from the results obtained from experimental procedures carried out in the same manner as in embodiment 8. UV discriminating ability is shown in the following Tables 2 and 3. Δ indicates that superior UV discriminating ability was demonstrated; indicates that comparatively good UV discriminating ability was demonstrated.

TABLE 2

| Embodiment No. | Article or Structure | UV discriminating ability |
|---|---|---|
| 21 | telephone card | Δ |
| 22 | business card | Δ |
| 23 | label | Δ |
| 24 | ski wear | Δ |
| 25 | swim wear | Δ |
| 26 | dress shirt/t-shirt | ○ |
| 27 | apron | Δ |
| 28 | handkerchief | Δ |
| 29 | key holder | Δ |
| 30 | coaster | Δ |
| 31 | yacht (hull, sail, etc.) | Δ |
| 32 | plastic mat | ○ |
| 33 | inner tube | ○ |
| 34 | wrist watch (metal band) | Δ |
| 35 | plastic money pouch | ○ |
| 36 | key holder for pool use | Δ |
| 37 | change purse | Δ |

TABLE 2-continued

| Embodiment No. | Article or Structure | UV discriminating ability |
| --- | --- | --- |
| 38 | lunch box | △ |
| 39 | jump rope | △ |
| 40 | sun visor | △ |
| 41 | ballpoint pen/mechanical pencil | △ |
| 42 | balloon | ○ |
| 43 | fan | △ |
| 44 | broach | △ |

TABLE 3

| Embodiment No. | Article or Structure | UV discriminating ability |
| --- | --- | --- |
| 45 | pool | △ |
| 46 | garage | △ |
| 47 | house entrance way | △ |
| 48 | bicycle | △ |
| 49 | hat | △ |
| 50 | pool (deck and bottom) | △ |
| 51 | button | △ |
| 52 | binoculars | △ |
| 53 | camera | △ |
| 54 | eye glasses | △ |
| 55 | portable cordless device (base and antenna) | △ |
| 56 | helmet | △ |
| 57 | beach parasol | ○ |
| 58 | outdoor table | △ |
| 59 | tent | ○ |
| 60 | plastic raincoat | △ |
| 61 | window glass | △ |
| 62 | water bottle | △ |
| 63 | ski board | △ |
| 64 | ski goggles | △ |
| 65 | sunglasses | △ |
| 66 | wet suit | ○ |
| 67 | snorkel | △ |
| 68 | video camera | △ |

EMBODIMENT 69

Two types of PMMA were produced by injection molding (poly(methyl methacrylate)) (PMMA) containing a photochromic material and a UV-A absorbing pigment, and PMMA containing a photochromic material and a UV-B absorbing pigment. These two types of PMMA were, in the same manner as utilized in embodiment 8, adhered in parallel with adhesive to the compact substrate, thereby producing a UV-A, UV-B discriminating sensor. Performance was approximately identical to that in embodiment 8.

What is claimed is:

1. A UV-A, UV-B discriminating sensor comprising:
   a first sensor formed on a substrate material for detecting UV-A radiation having a wavelength not less than 320 nm and not more than 400 nm, and
   a second sensor formed on said substrate material in parallel for detecting UV-B radiation having a wavelength not less than 280 nm and not more than 320 nm,
   wherein said first sensor comprises a photochromic layer formed on the substrate material, wherein said photochromic layer comprises a photochromic composition responsive to ultraviolet radiation having a wavelength not less than 280 nm and not more than 400 nm, and a first pigment layer formed on the photochromic layer, wherein said first pigment layer comprises a UV radiation absorbing pigment which absorbs ultraviolet radiation having a wavelength not more than 320 nm, and wherein UV-A and visible radiation pass through said first pigment layer; and
   said second UV sensor comprising a photochromic layer formed on the substrate material, wherein said photochromic layer comprises a photochromic composition responsive to ultraviolet radiation having a wavelength not less than 280 nm and not more than 400 nm, and a second pigment layer formed on the photochromic layer, wherein said second pigment layer comprises a UV radiation absorbing pigment which absorbs ultraviolet radiation having a wavelength not less than 320 nm and not more than 400 nm, and wherein UV-B and visible radiation pass through said second pigment layer.

2. A UV-A, UV-B discriminating sensor according to claim 1, wherein said UV radiation absorbing pigment in the first pigment layer of the first sensor is 2'-ethylhexyl-4-methoxy-cinnamate or 2,4-dinitrophenol; and
   said UV radiation absorbing pigment in the second pigment layer of the second sensor is 4-t-butyl-4'-methoxy-dibenzoyl methane.

3. A UV-A, UV-B discriminating sensor according to claim 1, wherein said photochromic composition is a spiropyran, fulgide or diallyl ethene.

* * * * *